United States Patent
Tamatani

(10) Patent No.: US 10,620,484 B2
(45) Date of Patent: Apr. 14, 2020

(54) METHOD OF MANUFACTURING LIQUID CRYSTAL DISPLAY DEVICE AND MANUFACTURING SYSTEM FOR LIQUID CRYSTAL DISPLAY DEVICE

(71) Applicant: Mitsubishi Electric Corporation, Tokyo (JP)

(72) Inventor: Akira Tamatani, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 186 days.

(21) Appl. No.: 15/822,722

(22) Filed: Nov. 27, 2017

(65) Prior Publication Data

US 2018/0148531 A1    May 31, 2018

(30) Foreign Application Priority Data

Nov. 30, 2016   (JP) .................................. 2016-232276

(51) Int. Cl.
*G02F 1/1341*    (2006.01)
*G02F 1/1339*    (2006.01)
*G02F 1/13*    (2006.01)

(52) U.S. Cl.
CPC .......... *G02F 1/1341* (2013.01); *G02F 1/1303* (2013.01); *G02F 1/1309* (2013.01); *G02F 1/1339* (2013.01); *G02F 1/13394* (2013.01); *G02F 2001/13398* (2013.01); *G02F 2001/13415* (2013.01)

(58) Field of Classification Search
CPC ......... G02F 1/1303; G02F 2001/13415; G02F 1/1309
See application file for complete search history.

(56) References Cited

U.S. PATENT DOCUMENTS

| 7,102,726 B2 | 9/2006 | Byun et al. |
| 7,436,483 B2 | 10/2008 | Byun et al. |
| 9,075,256 B2 | 7/2015 | Tamatani et al. |
| 2001/0026348 A1* | 10/2001 | Murata ................. G02F 1/1341 349/187 |
| 2003/0231278 A1* | 12/2003 | Nam ..................... G02F 1/1341 349/190 |

(Continued)

FOREIGN PATENT DOCUMENTS

| JP | 2005-258422 A | 9/2005 |
| JP | 2007-213092 A | 8/2007 |

(Continued)

*Primary Examiner* — Alexander P Gross
(74) *Attorney, Agent, or Firm* — Studebaker & Brackett PC

(57) ABSTRACT

At least one columnar spacer is formed on a first substrate. A height of the columnar spacer is measured. In order to provide a liquid crystal layer, liquid crystal is dropped onto any one of the first substrate and a second substrate with an amount of the liquid crystal determined based on a determination function dependent upon the height of the columnar spacer. The determination function is provided in advance in consideration of prevention of maldistribution the liquid crystal layer caused by temperature increase, prevention of generation of air bubbles inside a gap caused by temperature decrease, and satisfaction of an upper limit condition and a lower limit condition for a dimension of the gap required by optical properties of a liquid crystal panel.

18 Claims, 16 Drawing Sheets

(56) References Cited

U.S. PATENT DOCUMENTS

2006/0119769 A1* 6/2006 Zhu .................... G02F 1/13363
                                                             349/113
2006/0280878 A1   12/2006 Suezaki et al.
2014/0140366 A1*  5/2014 Tamatani ............. G02F 1/1333
                                                             374/45

FOREIGN PATENT DOCUMENTS

| JP | 2008-065077 A | 3/2008 |
| JP | 2010-139568 A | 6/2010 |
| JP | 2014-102470 A | 6/2014 |

* cited by examiner

F I G 1
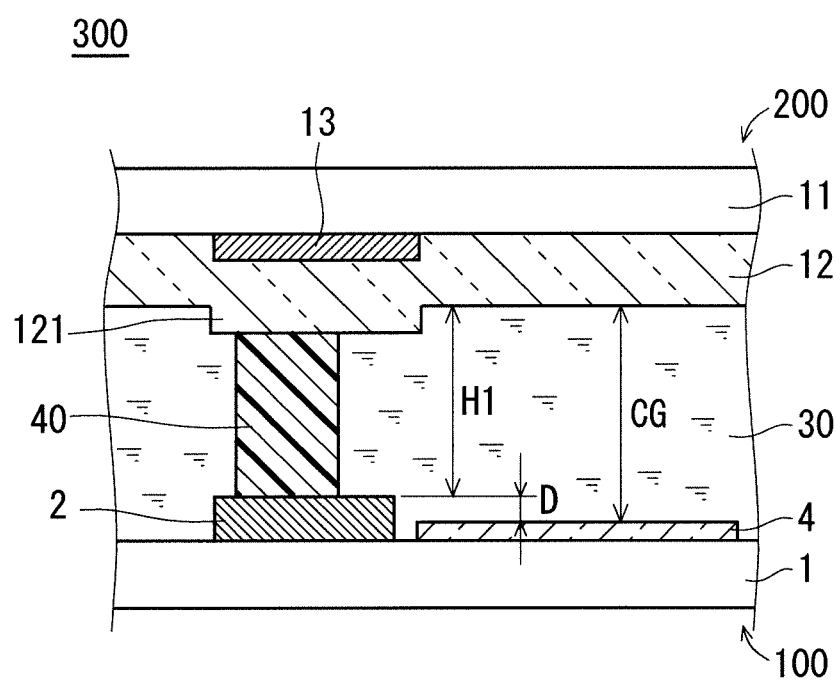

F I G . 2
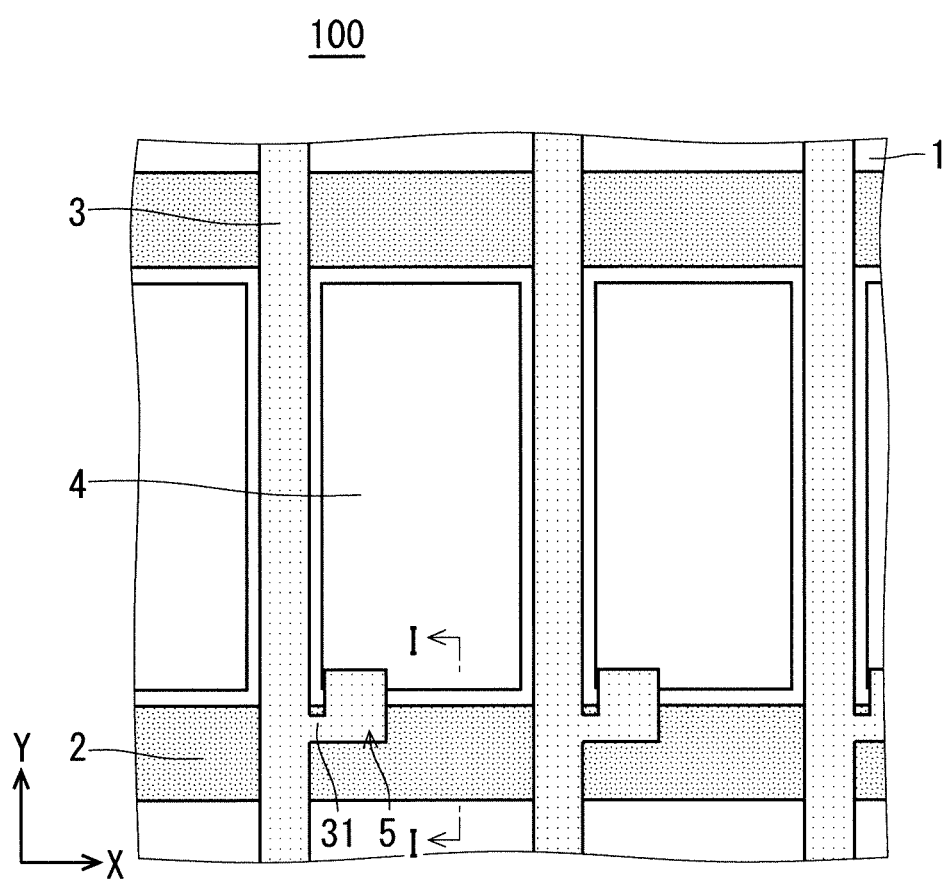

F I G . 3
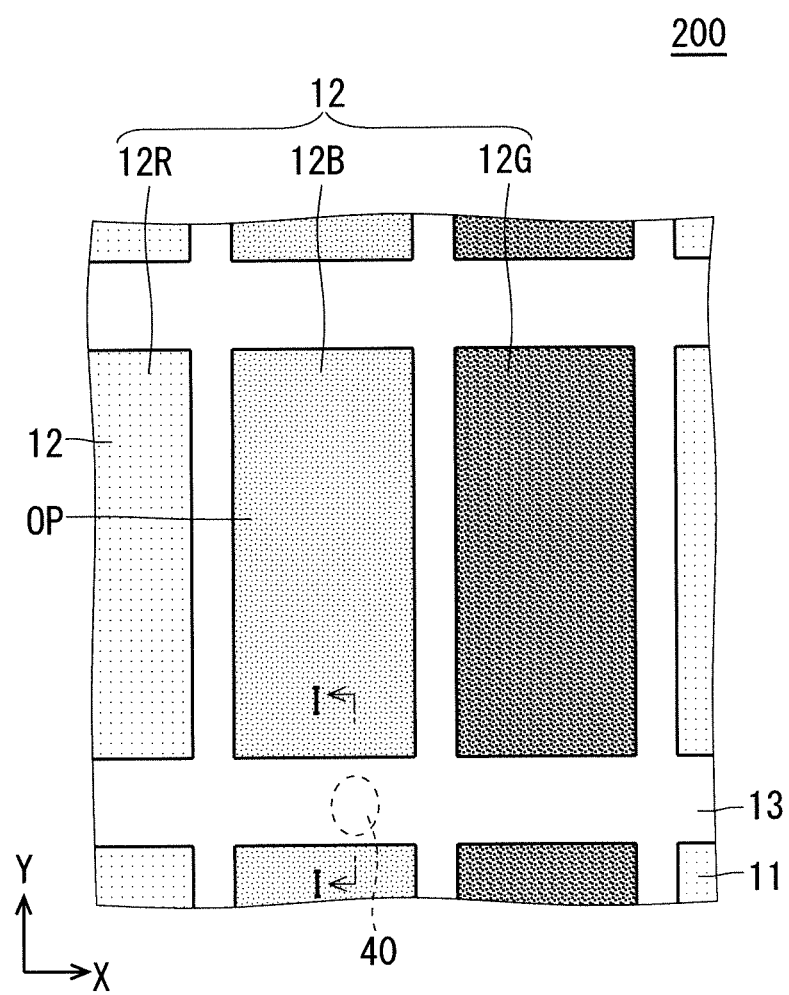

F I G . 6
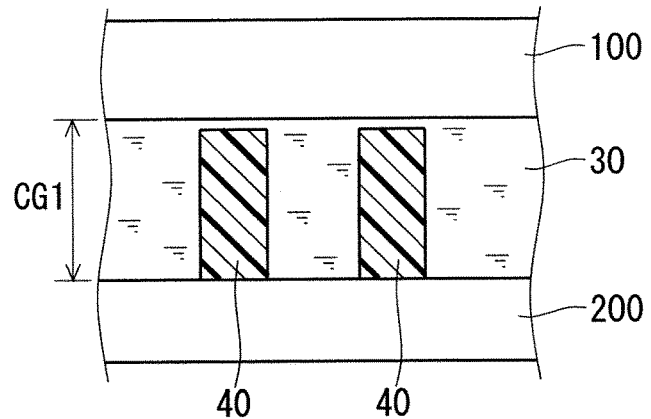
F I G . 7
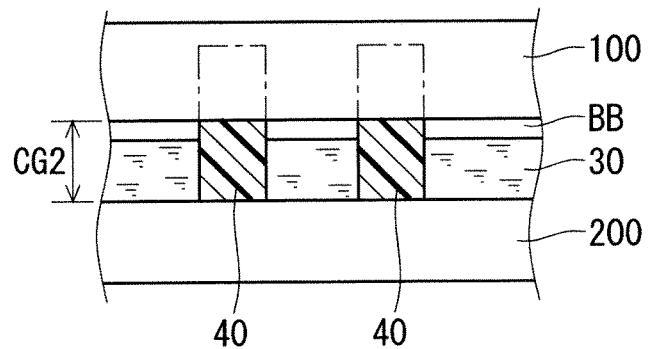
F I G . 8
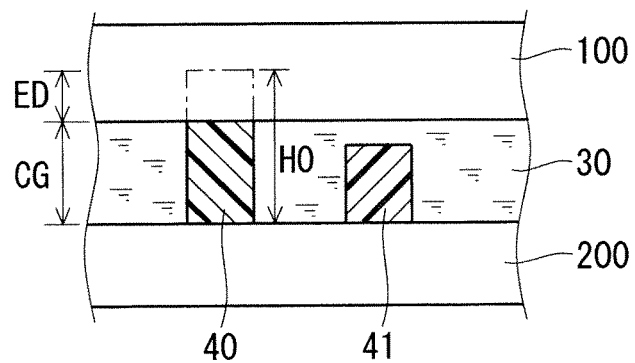

F I G . 9
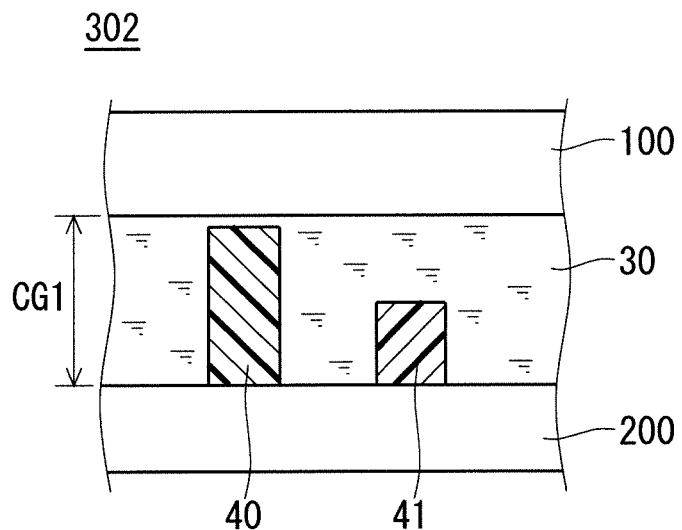
F I G . 1 0
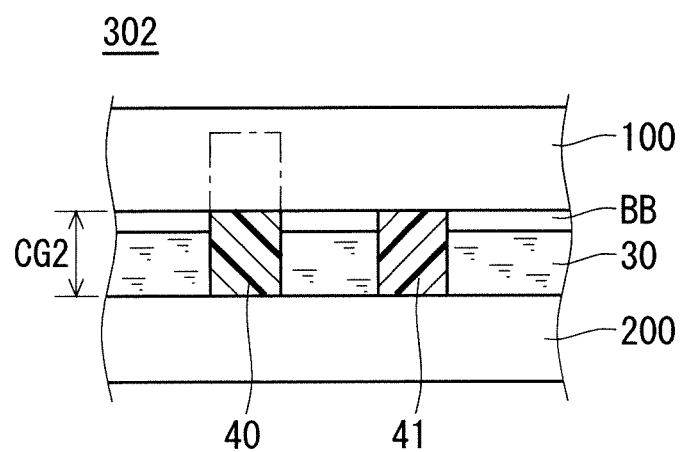

METHOD OF MANUFACTURING LIQUID CRYSTAL DISPLAY DEVICE AND MANUFACTURING SYSTEM FOR LIQUID CRYSTAL DISPLAY DEVICE

BACKGROUND OF THE INVENTION

Field of the Invention

The present invention relates to a method of manufacturing a liquid crystal display device and a manufacturing system for a liquid crystal display device, and more particularly, to a method of manufacturing a liquid crystal display device including at least one columnar spacer for retaining a gap between substrates and a manufacturing system for the liquid crystal display device.

Description of the Background Art

A liquid crystal display device includes a liquid crystal panel in which an image is displayed, and further includes a backlight in a case of a transmission type or a semi-transmission type. The liquid crystal panel includes a pair of substrates that oppose each other through intermediation of a liquid crystal layer. Typically, one substrate is an active matrix substrate, that is, a thin film transistor (TFT) substrate. Another substrate is a color filter (CF) substrate. In the TFT substrate, wirings are arranged in a lattice shape. Specifically, source wirings and gate wirings are arranged so as to cross each other. The TFTs are arranged in crossing portions thereof. In the CF substrate, pixel portions are defined by a black matrix (BM). In the pixel portions, color filters of red (R), green (G), and blue (B) are formed.

A gap is formed between the TFT substrate and the CF substrate, and liquid crystal is sealed inside the gap, thereby forming the liquid crystal layer. A dimension of the gap is fixedly retained by spacers arranged between the substrates. As the spacers, particles of spacer beads having a diameter of approximately several micrometers may be used. The spacer beads are randomly dispersed on the substrates, and thus the spacer beads may adversely be arranged even in the pixel portions in some cases. For this reason, alignment of the liquid crystal may be disturbed in the periphery of the spacer beads. As a result, image quality may be lowered, for example, contrast of the image may be lowered through generation of a phenomenon in which light is leaked (light leakage). In view of the above, in a case where a high image quality is required, columnar spacers tend to be used instead of the spacer beads.

Under high temperature, elastic deformation of the columnar spacers may hardly follow thermal expansion of the liquid crystal. In such a case, the liquid crystal is stagnated on a lower side of the panel due to gravity, and thus the gap on the lower side of the panel becomes larger. In other words, so-called gap unevenness (gravity unevenness, high-temperature gap unevenness, or swelling under high temperature) is generated. Further, under low temperature, the elastic deformation of the columnar spacers may hardly follow thermal contraction of the liquid crystal. In such a case, a pressure inside a liquid crystal cell falls abruptly, and thus air bubbles are generated. That is, so-called low-temperature bubbling is generated.

In view of the above, according to Japanese Patent Application Laid-Open No. 2005-258422, Japanese Patent Application Laid-Open No. 2008-65077, and Japanese Patent Application Laid-Open No. 2007-213092, there are disclosed a technology of optimizing an amount of the liquid crystal of the liquid crystal layer to be formed between the substrates in accordance with an elastic deformation rate of the columnar spacers and a measured height of the columnar spacers, and a technology of using the columnar spacers having a large range of elastic deformation in order to widen an allowance for the high-temperature gap unevenness, the low-temperature bubbling, and the like. Further, according to Japanese Patent Application Laid-Open No. 2010-139568, two types of columnar spacers having different heights are used, and densities thereof are changed in regions. With this, the low-temperature bubbling is suppressed.

Dispersion is present in the heights of the columnar spacers. For this reason, it is desirable that the amount of the liquid crystal of the liquid crystal layer to be formed between the substrates be set in accordance with the heights of the columnar spacers. With this, the high-temperature gap unevenness and the low-temperature bubbling can be prevented as much as possible.

On the other hand, in order to obtain a liquid crystal display panel having a high display performance, it is necessary to reduce errors in the dimension of the gap between the substrates. The gap is expanded as the amount of the liquid crystal sealed therein is larger. For this reason, the dimension of the gap is proportional to the amount of the liquid crystal. Thus, when the amount of the liquid crystal is determined in consideration of prevention the generation of the high-temperature gap unevenness and the generation of the low-temperature bubbling alone, the dimension of the gap may become inappropriate. As a result, a yield rate in manufacture of the liquid crystal display device is lowered.

SUMMARY

The present invention is made in order to solve the problems as described above, and has an object to provide a method of manufacturing a liquid crystal display device and a manufacturing system for a liquid crystal display device, in which the liquid crystal display device can be manufactured with a high yield rate even when a height of at least one columnar spacer has dispersion.

A method of manufacturing a liquid crystal display device according to the present invention is a method of manufacturing a liquid crystal display device including a liquid crystal panel having a first substrate and a second substrate that oppose each other through intermediation of a gap, at least one columnar spacer for retaining the gap, and a liquid crystal layer inside the gap. The at least one columnar spacer is formed on the first substrate. A height of the at least one columnar spacer is measured. Liquid crystal is dropped on any one of the first substrate and the second substrate with an amount of the liquid crystal that is determined based on a determination function dependent upon the height of the at least one columnar spacer in order to provide the liquid crystal layer. The determination function is provided in advance in consideration of prevention of maldistribution of the liquid crystal layer caused by temperature increase, prevention of generation of air bubbles inside the gap caused by temperature decrease, and satisfaction of an upper limit condition and a lower limit condition for a dimension of the gap required by optical properties of the liquid crystal panel.

A manufacturing system for a liquid crystal display device according to the present invention is a manufacturing system for a liquid crystal display device including a liquid crystal panel having a first substrate and a second substrate that oppose each other through intermediation of a gap, at least one columnar spacer for retaining the gap, and a liquid crystal layer inside the gap. The manufacturing system includes a height measurement device, a data acquirer, a quality determination device, and a liquid crystal amount calculation device. The height measurement device measures a height of the at least one columnar spacer formed on the first substrate. The data acquirer acquires data of an upper limit condition and a lower limit condition for a dimension of the gap required by optical properties of the liquid crystal panel. The quality determination device determines whether the first substrate on which the at least one columnar spacer is provided is defective or nondefective, based on the height of the at least one columnar spacer and on the upper limit condition and the lower limit condition for the dimension of the gap. The liquid crystal amount calculation device determines an amount of liquid crystal for providing the liquid crystal layer, based on the height of the at least one columnar spacer and on the upper limit condition and the lower limit condition for the dimension of the gap, in a case where determination is made as nondefective by the quality determination device.

According to the method of manufacturing a liquid crystal display device of the present invention, the determination function for determining the amount of the liquid crystal dependently upon the height of the at least one columnar spacer is provided in advance in consideration of prevention of the maldistribution of the liquid crystal layer caused by temperature increase, prevention of the generation of the air bubbles inside the gap caused by temperature decrease, and satisfaction of the upper limit condition and the lower limit condition for the dimension of the gap required by the optical properties of the liquid crystal panel. With this, even when the height of the at least one columnar spacer has dispersion, it is possible to more accurately prevent the maldistribution of the liquid crystal layer caused by temperature increase, prevent the generation of the air bubbles inside the gap caused by temperature decrease, and satisfy the upper limit condition and the lower limit condition for the dimension of the gap required by the optical properties of the liquid crystal panel. That is, even when the height of the at least one columnar spacer has dispersion, the liquid crystal display device can be manufactured with a high yield rate.

According to the manufacturing system for a liquid crystal display device of the present invention, in a case where the quality of the first substrate on which the at least one columnar spacer is provided is determined as nondefective, the amount of the liquid crystal is determined. With this, the first substrate, of which quality is determined as "defective," can be removed from a manufacturing process. Thus, even when the height of the at least one columnar spacer has dispersion, the liquid crystal display device can be manufactured with a high yield rate.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a view for schematically illustrating configuration of a liquid crystal panel of a liquid crystal display device according to a first preferred embodiment of the present invention, specifically, a partial sectional view taken along the line I-I of FIG. 2 and FIG. 3.

FIG. 2 is a partial plan view for schematically illustrating configuration of a TFT substrate of the liquid crystal panel of FIG. 1.

FIG. 3 is a partial plan view for schematically illustrating configuration of a CF substrate of the liquid crystal panel of FIG. 1.

FIG. 6 is a partial sectional view for illustrating a state in which extension of the columnar spacers fails to completely follow expansion of a liquid crystal layer when temperature of the liquid crystal panel of FIG. 5 is increased.

FIG. 7 is a partial sectional view for illustrating a state in which contraction of the columnar spacers fails to completely follow contraction of the liquid crystal layer when the temperature of the liquid crystal panel of FIG. 5 is decreased.

FIG. 8 is a partial sectional view for schematically illustrating configuration of the liquid crystal panel at the time of room temperature in a case where the columnar spacers have a plurality of heights.

FIG. 9 is a partial sectional view for illustrating a state in which the extension of the columnar spacers fails to completely follow the expansion of the liquid crystal layer when the temperature of the liquid crystal panel of FIG. 8 is increased.

FIG. 10 is a partial sectional view for illustrating a state in which the contraction of the columnar spacers fails to completely follow the contraction of the liquid crystal layer when the temperature of the liquid crystal panel of FIG. 8 is decreased.

DESCRIPTION OF THE PREFERRED EMBODIMENTS

Preliminary Description

Prior to descriptions of preferred embodiments of the present invention, causes of generation of high-temperature gap unevenness and low-temperature bubbling are described. First, a case where columnar spacers have uniform heights is described with reference to FIG. 5 to FIG. 7, and then a case where the columnar spacers have a plurality of heights is described with reference to FIG. 8 to FIG. 10.

Figure 5:
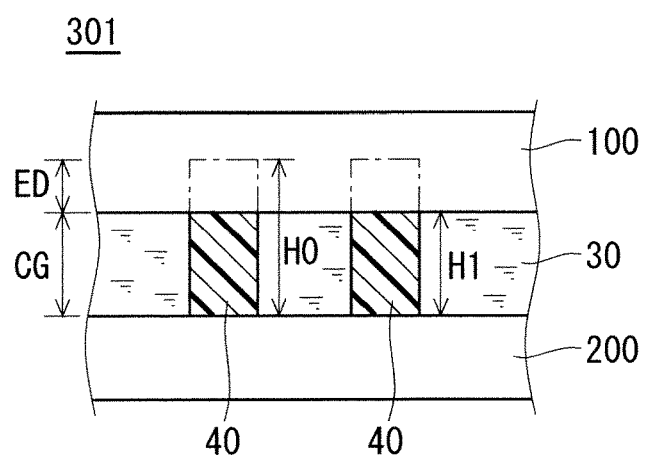
FIG. 5 is a partial sectional view for schematically illustrating configuration of the liquid crystal panel at the time of room temperature in a case where the columnar spacers have uniform heights.

FIG. 5 is a partial sectional view for schematically illustrating configuration of a liquid crystal panel 301 in a case where the columnar spacers have uniform heights. The liquid crystal panel 301 includes a CF substrate 200 (first substrate), a TFT substrate 100 (second substrate), columnar spacers 40, and a liquid crystal layer 30. The liquid crystal layer 30 is sealed between the CF substrate 200 and the TFT substrate 100 with a sealing material (not shown). Note that, in the following, a space defined by the CF substrate 200, the TFT substrate 100, and the sealing material is referred to as a "cell," and an interval (gap) between the CF substrate 200 and the TFT substrate 100 is referred to as a "cell gap" in some cases.

The columnar spacer 40 is usually compressed between the TFT substrate 100 and the CF substrate 200 in the liquid crystal panel 301. The columnar spacer 40 has a height H0 before being compressed, and after being compressed has a height H1 at the time of room temperature due to elastic deformation amount ED. Thus, a cell gap CG at the time of room temperature corresponds to the height H1. A compression amount of the columnar spacer 40 is reduced as the cell gap CG is increased due to thermal expansion of the liquid crystal layer 30. Thus, the columnar spacer 40 can follow the increase of the cell gap to a certain extent. In other words, the columnar spacer 40 can be extended to a certain extent in accordance with the increase of the cell gap.

FIG. 6 is a partial sectional view for illustrating a state in which extension of the columnar spacers 40 fails to completely follow expansion of the liquid crystal layer 30 when temperature of the liquid crystal panel 301 is increased. When a thickness of the liquid crystal layer 30 exceeds the original height H0 (FIG. 5) due to thermal expansion, the extension due to the elastic deformation of the columnar spacer 40 fails to follow the thermal expansion of the liquid crystal layer 30 any longer. As a result, a gap is generated between a distal end of the columnar spacer 40 and the TFT substrate 100. Thus, a cell gap CG1, which corresponds to the thickness of the liquid crystal layer 30 between the substrates, is not retained any longer by the columnar spacer 40. Liquid crystal, which corresponds to a volume no longer retained by the columnar spacer 40, is moved downward in the liquid crystal panel 301 due to gravity. With this, the liquid crystal is unevenly distributed downward. As a result, unevenness is generated in the cell gap. In other words, the high-temperature gap unevenness is generated.

FIG. 7 is a partial sectional view for illustrating a state in which contraction of the columnar spacers 40 fails to completely follow contraction of the liquid crystal layer 30 when the temperature of the liquid crystal panel 301 is decreased. Along with the contraction of the liquid crystal layer 30 due to temperature decrease, the columnar spacer 40 is further compressed. Along with this, a repulsive force due to the elastic deformation of the columnar spacer 40 is increased. When the repulsive force reaches an atmospheric pressure, the columnar spacer 40 is not contracted any further. That is, the contraction due to the elastic deformation of the columnar spacer 40 fails to follow the contraction of the liquid crystal layer 30 any longer. Thus, when the thickness of the liquid crystal layer 30 is further contracted, a pressure inside the cell of the liquid crystal panel 301 starts to fall. As a result, inside the cell having a cell gap CG2, vacuum bubbles BB (air bubbles) are generated due to the low-temperature bubbling.

FIG. 8 is a partial sectional view for schematically illustrating configuration of a liquid crystal panel 302 at the time of room temperature in a case where the columnar spacers have a plurality of heights (in a case of a dual spacer structure). The liquid crystal panel 302 includes, as the columnar spacers thereof, a sub-columnar spacer 41 in addition to the above-mentioned columnar spacer 40. The sub-columnar spacer 41 has a height smaller than the height of the columnar spacer 40 under an uncompressed state. Further, in the liquid crystal panel 302 at the time of room temperature, the columnar spacer 40 is compressed between the substrates. However, the sub-columnar spacer 41 is not compressed.

FIG. 9 is a partial sectional view for illustrating a state in which the extension of the columnar spacers 40 fails to completely follow the expansion of the liquid crystal layer 30 when temperature of the liquid crystal panel is increased. When the thickness of the liquid crystal layer 30 exceeds the height H0 (FIG. 8) due to thermal expansion, similarly to the above-mentioned case of FIG. 6, the high-temperature gap unevenness is generated.

FIG. 10 is a partial sectional view for illustrating a state in which the contraction of the columnar spacers fails to completely follow the contraction of the liquid crystal layer 30 when the temperature of the liquid crystal panel of FIG. 8 is decreased. Along with the contraction of the liquid crystal layer 30 due to temperature decrease, the columnar spacer 40 is further compressed, and the sub-columnar spacer 41 eventually comes in contact also with the TFT substrate 100. Along with the further contraction of the liquid crystal layer 30, a repulsive force due to elastic deformation of the sub-columnar spacer 41 is increased. When the repulsive force of the columnar spacer 40 and the sub-columnar spacer 41 reaches an atmospheric pressure, the columnar spacer 40 and the sub-columnar spacer 41 are not contracted any further. That is, contraction due to the elastic deformation of the columnar spacer 40 and the sub-columnar spacer 41 fails to follow the contraction of the liquid crystal layer 30 any longer. Thus, when the thickness of the liquid crystal layer 30 is further contracted, a pressure inside the cell of the liquid crystal panel 302 starts to fall. As a result, inside the cell having the cell gap CG2, the vacuum bubbles BB are generated due to the low-temperature bubbling.

As described above, when the liquid crystal layer 30 is excessively expanded or contracted, the high-temperature gap unevenness or the low-temperature bubbling is generated. The cell gap CG at the time of room temperature becomes larger as an amount of the liquid crystal is larger, and hence the high-temperature gap unevenness is adversely generated even due to subtler temperature increase. Conversely, the cell gap CG at the time of room temperature becomes smaller as the amount of the liquid crystal is smaller, and hence the low-temperature bubbling is adversely generated even due to subtler temperature decrease. Thus, when the liquid crystal layer 30 is formed, it is desirable to determine such an optimal amount of the liquid crystal that can prevent both of the generation of the high-temperature gap unevenness and the generation of the low-temperature bubbling in accordance with the height of the columnar spacer.

Note that, as a reference for determining a range of the appropriate amount of the liquid crystal in accordance with the height of the columnar spacer 40, prevention of the generation of the high-temperature gap unevenness and the low-temperature bubbling is herein taken into consideration. However, other problems may be generated due to the amount of the liquid crystal not being an appropriate amount in accordance with the height of the columnar spacer 40. For example, when the amount of the liquid crystal is excessively small, uniformity in black may be deteriorated. Conversely, when the amount of the liquid crystal is excessively large, gap unevenness may be generated in a case where a surface of the liquid crystal panel is subjected to an outside load such as being pressed by a finger. In this manner, various problems may be present dependently upon the amount of the liquid crystal. In a case where such problems are generally taken into consideration, the reference for determining the range of the appropriate amount of the liquid crystal is in many cases determined based on the prevention of the generation of the high-temperature gap unevenness and the low-temperature bubbling as a result. However, such determination may generate other unallowable problems than the high-temperature gap unevenness and the low-temperature bubbling in some cases. In such a case, the reference for the range of the appropriate amount of the liquid crystal may be appropriately changed so that other problems than the high-temperature gap unevenness and the low-temperature bubbling can be prevented.

First Preferred Embodiment (Configuration of Liquid Crystal Panel)

FIG. 1 is a view for schematically illustrating configuration of a liquid crystal panel 300 of a liquid crystal display device according to this preferred embodiment, specifically, a partial sectional view taken along the line I-I of FIG. 2 and FIG. 3. FIG. 2 is a partial plan view for schematically illustrating configuration of the TFT substrate 100 of the liquid crystal panel 300. FIG. 3 is a partial plan view for schematically illustrating configuration of the CF substrate 200 of the liquid crystal panel 300. The liquid crystal panel 300 includes the CF substrate 200 (first substrate) and the TFT substrate 100 (second substrate) that oppose each other through intermediation of the cell gap CG, the columnar spacers 40 for retaining the cell gap CG, and the liquid crystal layer 30 inside the cell gap CG.

The TFT substrate 100 includes a transparent substrate 1, gate wirings 2, source wirings 3, a pixel electrode 4, and a TFT 5. The gate wirings 2 and the source wirings 3 are provided on the transparent substrate 1, and form a latticed wiring structure by crossing each other. A region surrounded by a pair of adjacent gate wirings 2 and a pair of adjacent source wirings 3 is a pixel region. Thus, the TFT substrate 100 has configuration in which a plurality of the pixel regions are arrayed in a matrix shape. The pixel electrode 4 is arranged inside each pixel region. The TFT 5 is a switching element for driving the liquid crystal panel 300, and is arranged at a crossing portion of the gate wirings 2 and the source wirings 3.

The CF substrate 200 includes a glass substrate 11, a coloring material layer 12, and a black matrix (BM) layer 13. The coloring material layer 12 is formed on the glass substrate. The coloring material layer 12 includes a red layer 12R, a green layer 12G, and a blue layer 12B, which are arranged in the X direction and the Y direction in a matrix shape. The BM layer 13 is arranged in a gap in the arrangement of the matrix shape. The coloring material layer 12 has a projecting portion 121 (FIG. 1) that projects toward the TFT substrate 100 in the thickness direction by being overlapped with the BM layer 13.

The columnar spacer 40 is formed on the projecting portion 121 (FIG. 1) of the coloring material layer 12. Thus, the columnar spacer 40 is arranged so as to be overlapped with the BM layer 13 in a plan layout (FIG. 3). With this, the columnar spacer 40 is prevented from blocking travelling of light. The columnar spacer 40 is subjected to elastic deformation by being pressed onto the gate wirings 2 of the TFT substrate 100. With this, as described with reference to FIG. 5, the columnar spacer 40 is compressed into the height H1 after compression from the height H0 before compression.

In FIG. 1, the cell gap CG represents a dimension between a reference surface on the CF substrate 200 side and a reference surface on the TFT substrate 100 side. Here, the reference surface on the CF substrate 200 side is a surface of the coloring material layer 12 at a position out of the BM layer 13 in the plan layout. In order to facilitate the description below, the surface is also used as a reference surface of the columnar spacer 40 having the height H1 on the CF substrate 200 side. That is, the height H1 corresponds to the sum of a dimension of the length of the columnar spacer 40 itself and a dimension of the projection of the projecting portion 121. A reference surface of the cell gap CG on the TFT substrate 100 side is a surface of the pixel electrode 4. On the other hand, a reference surface of the height H1 on the TFT substrate 100 side is a surface of the gate wiring 2. On the surface of the gate wiring 2, there is a level difference D with respect to a surface of the pixel electrode 4. Thus, the cell gap CG corresponds to the sum of the height H1 and the level difference D. In the description below, such an example of a case is given that the level difference D is 0.4 μm. Note that, the above-mentioned reference surfaces are merely an example, and other reference surfaces may be adopted.

Figure 4:
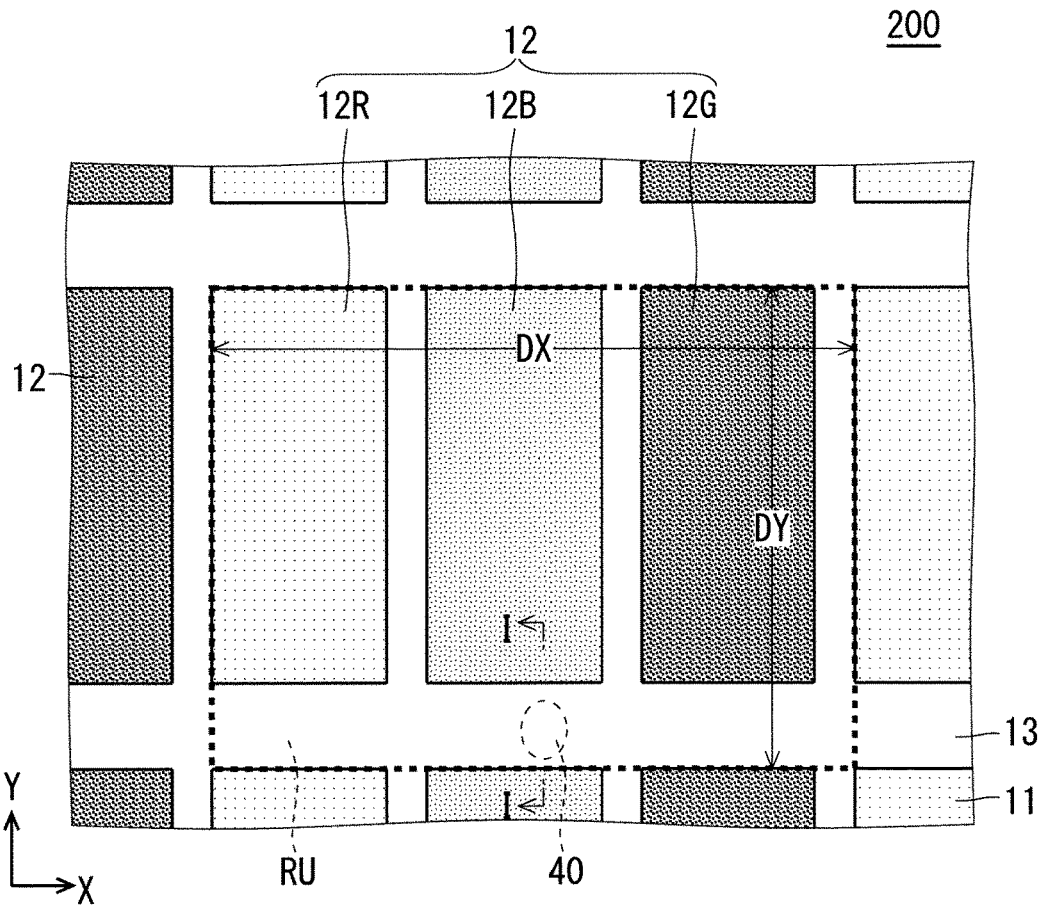
FIG. 4 is a partial plan view for illustrating a definition of an area occupancy rate of a columnar spacer in the liquid crystal panel of FIG. 1.

With reference to FIG. 4, an area occupancy rate of the columnar spacer 40 is described. In FIG. 4, as surrounded by the broken line, a region formed of one set of pixel region including the red layer 12R, the green layer 12G, and the blue layer 12B, and a region including one side of the BM layer 13 along the X direction and another side along the Y direction out of the BM layer 13 surrounding the pixel region is referred to as a repeating unit RU. An area occupied by the columnar spacer 40 out of an entire area of the repeating unit RU is defined as the area occupancy rate of the columnar spacer 40. In the illustrated example, one columnar spacer 40 is provided in one repeating unit RU. Hence, when a length of the repeating unit RU in the X direction is represented as DX, a length of the repeating unit RU in the Y direction is represented as DY, and an area of an end surface of the columnar spacer 40 (area in plan view) is represented as S, the area occupancy rate is defined as follows:

Area occupancy rate=$S/(DX \times DY) \times 100$[%]

(Method of Manufacturing Liquid Crystal Panel)

Figure 11:
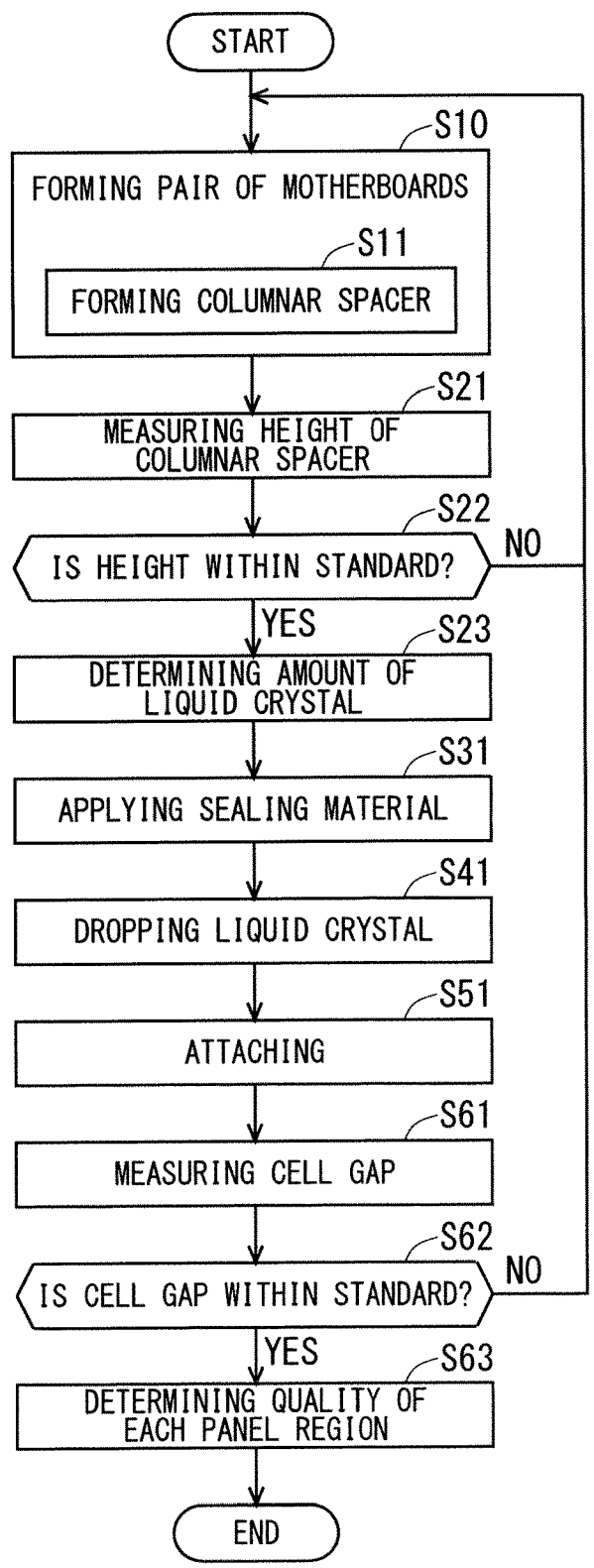
FIG. 11 is a flow chart for schematically illustrating a method of manufacturing a liquid crystal display device according to the first preferred embodiment of the present invention.

With reference to FIG. 11, a method of manufacturing a liquid crystal panel is described below. Note that, the liquid crystal panel is usually manufactured in such a manner that one or more liquid crystal panels are cut out of a mother substrate that is larger than the liquid crystal panel. Thus, the mother substrate includes a region (panel region), which eventually becomes one or more liquid crystal panels. Cutting a plurality of liquid crystal panels out of the mother substrate is also referred to as "multiple surface forming." The illustrated flow shows processes in the state of a mother substrate.

First, in Step S10, a pair of mother substrates is formed, which corresponds to the TFT substrate 100 (FIG. 2) and the CF substrate 200 (FIG. 3). Specifically, a step of forming the gate wirings 2, the source wirings 3, the pixel electrode 4, and the like is performed on the mother substrate including the TFT substrate 100. Further, a step of forming the coloring material layer 12, the BM layer 13, and the like is performed on the mother substrate including the CF substrate 200.

Step S10 includes Step S11 of forming the columnar spacer 40 (FIG. 1) on the mother substrate including the CF substrate 200. The columnar spacer 40 is formed with use of, for example, a photosensitive resin. In this preferred embodiment, a premise is made on a case where the columnar spacers have uniform heights (refer to FIG. 5). After Step S11, an alignment film (not shown) is formed with a usual method. For example, with a printing method, a material for the alignment film, which is formed of an organic material, is applied onto the surfaces of the TFT substrate 100 and the CF substrate 200 that oppose each other. Then, the layers subjected to the application are baked with a hot plate or the like. Then, rubbing is performed on the material for the alignment film, and alignment treatment is thereby performed on a surface of the material for the alignment film. The columnar spacer 40 is formed before the alignment film is formed, and thus the columnar spacer 40 is covered with the alignment film. However, a thickness of the alignment film is sufficiently small compared to the height of the columnar spacer 40, and thus influence of the thickness of the alignment film may be ignored.

Next, in Step S21, the height of the columnar spacer 40 formed on the mother substrate including the CF substrate 200, that is, the height H0 before being compressed (FIG. 5) is measured. In a case where the quality is accurately managed with a panel region being a unit, the height measurement is performed on each panel region inside the mother substrate. Note that, as a modified example, the columnar spacer 40 may be formed on the mother substrate including the TFT substrate 100. In such a case, the height H0 of the columnar spacer 40 formed on the mother substrate including the TFT substrate 100 is measured.

Next, in Step S22, it is determined whether or not the height H0 of the columnar spacer 40 (FIG. 5) is within an allowable height. Detail of the "allowable height" is described later. In a case where the measurement of the height H0 is performed with a panel region being a unit, determination of the quality is performed with a panel region being a unit. In this case, when the determination of at least one panel region inside the mother substrate is "nondefective," the processing may proceed to Step S23. At this time, it is preferable that information of the quality of each panel region be stored in a memory or the like. In a case where none of panel regions has the determination result of "nondefective" inside the mother substrate, the mother substrate is removed from a manufacturing process, and the processing returns to Step S10.

In Step S23, an amount of the liquid crystal, which is a dropping amount of the liquid crystal in a step of dropping the liquid crystal to be described later, is determined for each panel region inside the mother substrate. A method of calculating the amount of the liquid crystal is described later.

Next, in Step S31, a seal pattern formed of the sealing material is formed. For example, with a dispenser method, a paste material corresponding to the sealing material is applied onto the mother substrate including the TFT substrate 100 or the CF substrate 200. The paste material is applied so as to surround a display region of the liquid crystal panel.

Next, in Step S41, the step of dropping the liquid crystal for forming the liquid crystal layer 30 (FIG. 1) is performed with a drop injection method (one drop filling (ODF) method). Specifically, the liquid crystal is dropped in the region on the mother substrate that is surrounded by the seal pattern with the amount of the liquid crystal determined in Step S23. In this preferred embodiment, the liquid crystal is dropped onto each CF substrate 200 of the mother substrate. As a modified example, the liquid crystal may be dropped onto each TFT substrate 100 of the mother substrate.

Next, in Step S51, the mother substrate of the TFT substrate 100 and the mother substrate of the CF substrate 200 are attached in a vacuum state. With this, a mother cell substrate is formed. Then, ultraviolet rays are irradiated to the mother cell substrate, and the above-mentioned paste material for the sealing material is thereby provisionally cured. Then, the mother cell substrate is heated, to thereby perform post-curing. With this, a completely cured seal pattern formed of the sealing material is obtained.

Next, in Step S61, the cell gap CG (FIG. 1) is measured. The measurement may be performed by measuring the cell gap in an outer periphery of the mother cell substrate.

Next, in Step S62, it is determined whether or not the cell gap CG (FIG. 1) falls within a range of a cell-gap upper limit and a cell-gap lower limit that are required by optical properties. With this, quality of the mother cell substrate is determined. In a case where the determination result is "defective," the mother cell substrate is removed from the manufacturing process, and a new mother substrate is prepared through Step S10 again. In a case where the result is "nondefective," the processing proceeds to Step S63. Note that, the processing may proceed to Step S63 with omission of Step S62.

In Step S63, the quality of each region (panel region) of the mother cell substrate, which eventually becomes the liquid crystal panel, is determined. Specifically, in each panel region, the quality of each panel region is determined with reference to the height H0 of the columnar spacer 40 that is measured in Step S21 in the above and the cell gap of the mother cell substrate that is measured in Step S61 in the above. Detail of the determination is described later.

From the above, a final mother cell substrate is obtained.

Next, the mother cell substrate is cut along a scribe line. With this, individual liquid crystal panels are cut out of the mother cell substrate. Next, the liquid crystal panel determined as "defective" in Step 63 in the above is removed from the manufacturing process. Then, further steps are performed on the liquid crystal panel determined to be "nondefective" as needed. Specifically, a polarizing plate (not shown) is attached, and a control substrate is mounted. From the above, the liquid crystal panel 300 (FIG. 1) is obtained.

Note that, the liquid crystal panel 300 itself is also one type of liquid crystal display device. However, a backlight for supplying light to the liquid crystal panel 300 may further be provided, or the liquid crystal panel 300 and the backlight may be accommodated in a casing as needed. With this, the liquid crystal display device of a transmission type or a semi-transmission type is obtained.

(Method of Calculating Amount of Liquid Crystal in Step S23)

The amount of the liquid crystal is calculated based on a determination function dependent upon the height H0 of the columnar spacer 40 (FIG. 5). The determination function is provided in advance, before starting a process of calculating the amount of the liquid crystal, in consideration of prevention of the maldistribution of the liquid crystal layer 30 caused by temperature increase (high-temperature gap unevenness), prevention of the generation of the air bubbles inside the gap caused by temperature decrease (low-temperature bubbling), and satisfaction of an upper limit condition and a lower limit condition for a dimension of the gap required by optical properties of the liquid crystal panel 300.

Figure 12:
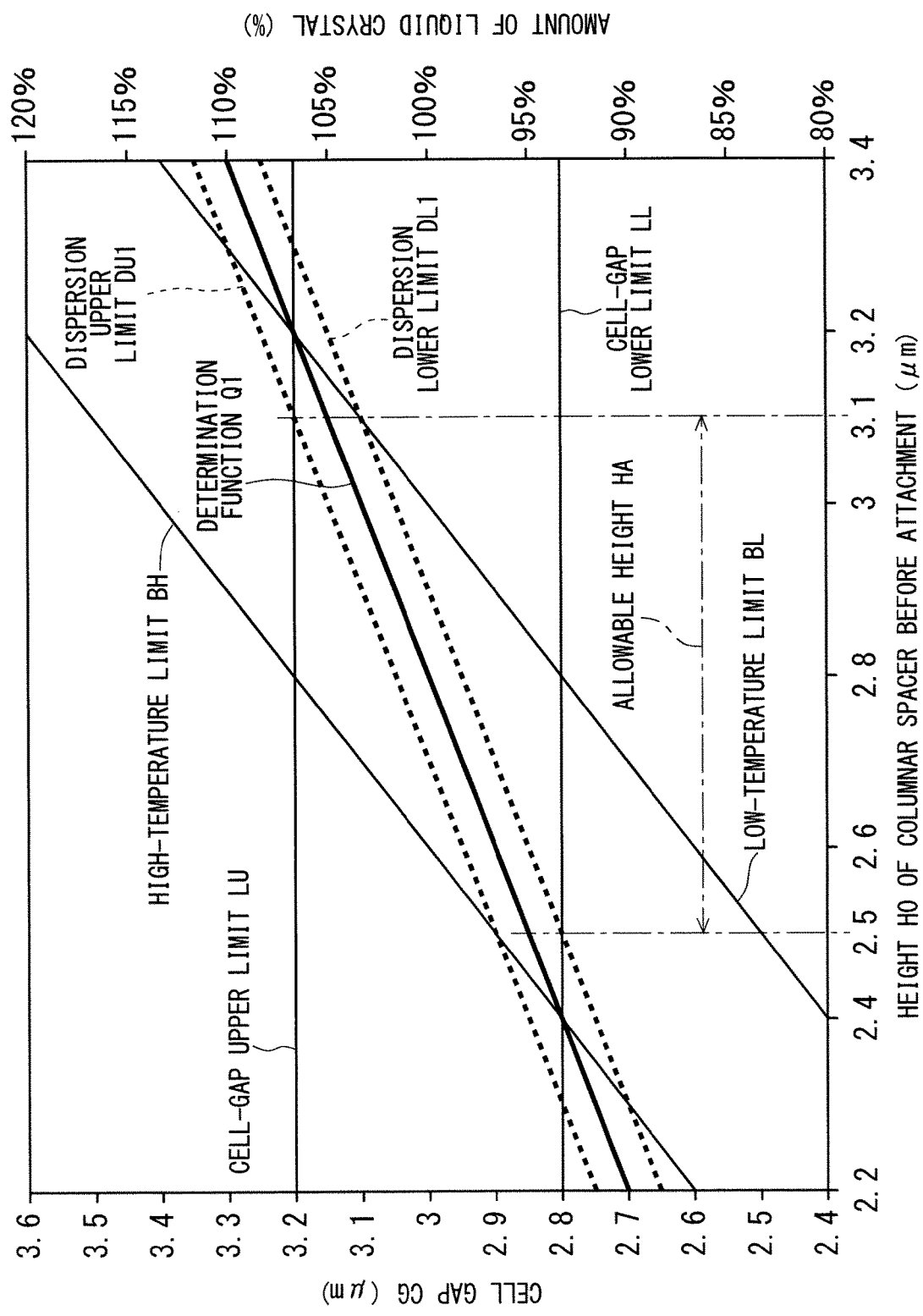
FIG. 12 is a graph for showing an example of a method of calculating an amount of liquid crystal in the method of manufacturing a liquid crystal display device according to the first preferred embodiment of the present invention.

FIG. 12 is a graph for showing an example of a method of calculating the amount of the liquid crystal according to this preferred embodiment. A horizontal axis represents the measured height H0 of the columnar spacer 40. A right vertical axis represents the amount of the liquid crystal. A left vertical axis represents estimated values of the cell gap CG in a case where the amount of the liquid crystal shown by the right vertical axis is applied. Note that, a unit of the amount of the liquid crystal is represented by being normalized by an amount estimated to cause the cell gap CG to be 3.0 μm (design center value). In other words, a relationship between the amount of the liquid crystal and the estimated cell gap CG in a case where this amount of the liquid crystal is applied is understood in advance. The amount of the liquid crystal and the cell gap CG are substantially in a proportional relationship, and hence the amount of the liquid crystal and the cell gap CG can be converted to one another with use of a design value for an area of a region in which the liquid crystal layer 30 is to be formed. The amount of the liquid crystal is determined based on a determination function Q1 dependent upon the height H0. A method of providing the determination function Q1 is described below.

A high-temperature limit BH (first upper limit function) is a function for defining a maximum value of the amount of the liquid crystal estimated to prevent the high-temperature gap unevenness. That is, the high-temperature limit BH defines the maximum value of the amount of the liquid crystal estimated to prevent the maldistribution of the liquid crystal layer 30 caused by temperature increase. A low-temperature limit BL (first lower limit function) is a function for defining a minimum value of the amount of the liquid crystal estimated to prevent the low-temperature bubbling. That is, the low-temperature limit BL defines the minimum value of the amount of the liquid crystal estimated to prevent the generation of the air bubbles inside the cell gap caused by temperature decrease. Thus, in the graph shown in FIG. 12, it is estimated that the high-temperature gap unevenness is generated in a region above the high-temperature limit BH, and that the low-temperature bubbling is generated in a region below the low-temperature limit BL.

In order to prevent the high-temperature gap unevenness and the low-temperature bubbling, in the completed liquid crystal panel, it is necessary that the columnar spacer 40 be compressed by an appropriate amount so as to be capable of following the change of the cell gap caused by the thermal expansion of the liquid crystal. That is, it is necessary that the compression amount be an appropriate amount between the upper limit and the lower limit. Accordingly, a value of the cell gap CG corresponding to the high-temperature limit BH corresponds to H0+α. Here, a dimension α is a value for causing the compression amount to be capable of preventing the high-temperature gap unevenness. The dimension α is determined based on a coefficient of thermal expansion of the liquid crystal, an upper limit temperature for use, the level difference D (FIG. 1), and the like. The dimension α may be determined with a prior experiment. In the example shown in FIG. 12, α=0.4 μm is applied. That is, the high-temperature limit BH is the amount of the liquid crystal that corresponds to the following expression:

cell gap $CG$=height of columnar spacer before compression $H0$+0.4 [μm]

and is defined as a linear function of the height H0. On the other hand, a value of the cell gap CG corresponding to the low-temperature limit BL corresponds to H0-β. Here, a dimension β is a value for causing the compression amount to be capable of preventing the low-temperature bubbling. The dimension β is determined based on a coefficient of thermal expansion of the liquid crystal, a lower limit temperature for use, the level difference D (FIG. 1), and the like. The dimension β may be determined with a prior experiment. In the example shown in FIG. 12, β=0.0 μm is applied. That is, the low-temperature limit BL is the amount of the liquid crystal that corresponds to the following expression:

cell gap $CG$=height of columnar spacer before compression $H0$+0.0 [μm]

and is defined as a linear function of the height H0.

Each of a cell-gap upper limit LU (second upper limit function) and a cell-gap lower limit LL (second lower limit function) is a function for defining the amount of the liquid crystal which is estimated to satisfy the upper limit condition and the lower limit condition for the dimension of the cell gap CG (that is, the thickness of the liquid crystal layer 30) required by the optical properties of the liquid crystal panel 300. Typically, each of the cell-gap upper limit LU and the cell-gap lower limit LL is a constant. In other words, each of the cell-gap upper limit LU and the cell-gap lower limit LL is a constant function.

In a case of the cell gap CG of the liquid crystal panel of a horizontal electric field type, from the view point of the optical properties, a design center value is set to approximately 3.0 μm, and an allowable range may be set to approximately ±5% of the center value, for example. In the example shown in FIG. 12, the design center value is set to 3.0 μm, and the allowable range is set to ±0.2 μm. That is, the standard of the cell gap CG is set to a range of from 2.8 μm to 3.2 μm. Note that, the standard is merely an example, and the standard to be used in actuality may be arbitrarily set dependently upon specifications of the liquid crystal panel.

The determination function Q1 calculates the amount of the liquid crystal within a nondefective-product range that is defined by the high-temperature limit BH, the low-temperature limit BL, the cell-gap upper limit LU, and the cell-gap lower limit LL (range of a parallelogram of FIG. 12). In a case where the columnar spacer 40 having the height H0 before compression is provided, an allowable range of the amount of the liquid crystal can be read from the nondefective-product range that corresponds to the height H0. When the liquid crystal is dropped with the amount of the liquid crystal within the range, it is estimated that all of the prevention of the high-temperature gap unevenness, the prevention of the low-temperature bubbling, and the sufficient optical properties of the liquid crystal panel 300 are fulfilled. Conversely, when the amount of the liquid crystal out of the nondefective-product range is dropped, it is estimated that at least one of the above requirements fails to be fulfilled. In this preferred embodiment, the determination function Q1 is defined by a linear function including an intersection of the high-temperature limit BH and the cell-gap lower limit LL and an intersection of the low-temperature limit BL and the cell-gap upper limit LU.

("Allowable Height" in Step S22)

As mentioned above, when the amount of the liquid crystal within the nondefective-product range that corresponds to the height H0 is dropped, it is estimated that the quality is fulfilled. Thus, from the viewpoint of the quality, whether or not the height H0 is allowed may be determined based on whether or not the nondefective-product range that corresponds to the height H0 is present.

However, dispersion may be present in the correlation of the amount of the liquid crystal and the cell gap CG. When the inventor of the present invention evaluated the relationship between the amount of the liquid crystal that is dropped in actuality and the cell gap CG that is measured in actuality in the final liquid crystal panel 300, the cell gap CG had dispersion with respect to the amount of the liquid crystal in a range of ±0.05 μm. For this reason, preferably, the standard of the height H0 of the columnar spacer is determined in consideration of the dispersion. In FIG. 12, the dispersion is represented as a dispersion upper limit DU1 and a dispersion lower limit DL1. When the dispersion upper limit DU1 and the dispersion lower limit DL1 are taken into consideration, an upper limit and a lower limit of the cell gap CG can be estimated, which are obtained in a case where the liquid crystal is dropped with the amount of the liquid crystal that is determined in accordance with the determination function Q1. In such a case, a range of the allowable height H0, that is, an allowable height HA, is from 2.5 μm or more and 3.1 μm or less. The lower limit value of 2.5 μm corresponds to an intersection of the dispersion lower limit DL1 and the cell-gap lower limit LL, and the upper limit value of 3.1 μm corresponds to the intersection of the dispersion upper limit DU1 and the cell-gap upper limit LU.

Note that, the above-mentioned dispersion may not be taken into consideration in a case where the dispersion is sufficiently small. In such a case, in the example of FIG. 12, the allowable height is from 2.4 μm or more and 3.2 μm or less.

(Quality Determination of Panel Region in Step S63)

At the time of Step S63, data of the height H0 of the columnar spacer 40 measured in each panel region in Step S21 and data of the cell gap CG of the mother cell substrate are understood. The quality of each panel region is determined based on whether or not data points determined by those data are included in the above-mentioned nondefective-product range (range of a parallelogram of FIG. 12). Note that, the determination whether or not the definition by the cell-gap upper limit LU and the cell-gap lower limit LL is satisfied is already made in Step S62, and hence determination whether or not the definition by the high-temperature limit BH and the low-temperature limit BL is satisfied only needs to be made in Step S63. That is, it suffices to determine whether or not the above-mentioned data points are positioned within the strip region between the high-temperature limit BH and the low-temperature limit BL.

(Comparative Example)

Figure 13:
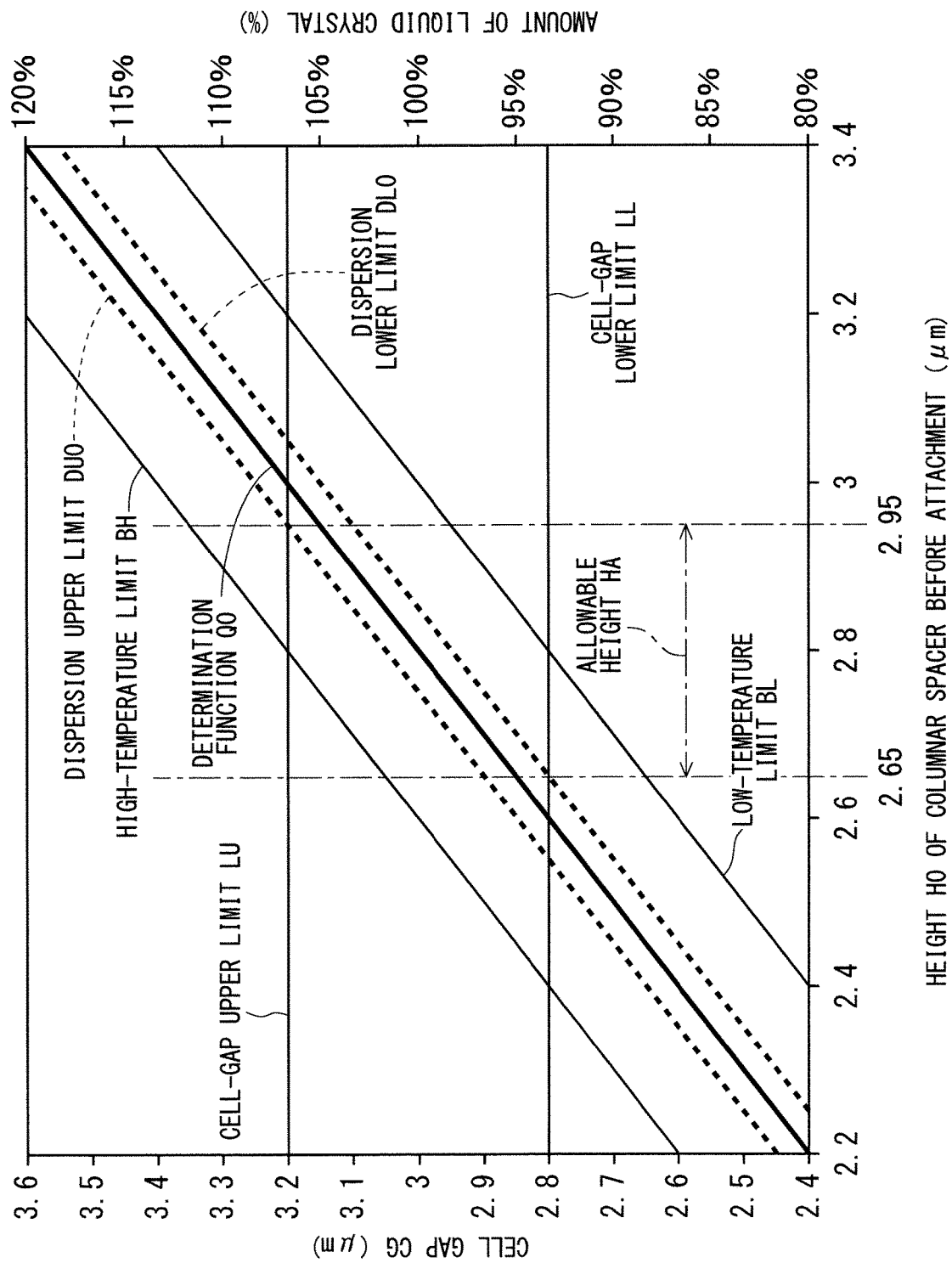
FIG. 13 is a graph for showing a method of calculating the amount of the liquid crystal according to a comparative example.

FIG. 13 is a graph for showing a method of calculating the amount of the liquid crystal according to a comparative example in comparison to FIG. 12. A determination function Q0 of this comparative example is different from the determination function Q1 (FIG. 12) in that the determination function Q0 is provided in consideration of the high-temperature limit BH and the low-temperature limit BL alone. When dispersion in the correlation of the amount of the liquid crystal and the cell gap, that is, a dispersion upper limit DU0 and a dispersion lower limit DL0, is taken into consideration, the allowable height HA according to this comparative example is from 2.65 μm or more and 2.95 μm or less, and hence the allowable range is 0.3 μm. On the contrary, in the preferred embodiment (FIG. 12), the allowable height HA is from 2.5 μm or more and 3.1 μm or less, and hence the allowable range is 0.6 μm. Thus, according to this preferred embodiment in comparison to the comparative example, larger dispersion is allowed in the height H0 of the columnar spacer.

(Effects)

According to this preferred embodiment, the determination function Q1 (FIG. 12) for determining the amount of the liquid crystal dependently upon the height H0 of the columnar spacer 40 (FIG. 5) is provided in advance in consideration of prevention of the maldistribution of the liquid crystal layer 30 caused by temperature increase, prevention of the generation of the air bubbles inside the gap caused by temperature decrease, and satisfaction of the upper limit condition and the lower limit condition for the dimension of the gap required by the optical properties of the liquid crystal panel 300. In other words, the determination function Q1 is provided in consideration of the high-temperature limit BH, the low-temperature limit BL, the cell-gap upper limit LU, and the cell-gap lower limit LL. With this, even when the height H0 of the columnar spacer 40 has dispersion, it is possible to more accurately prevent the maldistribution of the liquid crystal layer 30 caused by temperature increase, prevent the generation of the air bubbles inside the gap caused by temperature decrease, and satisfy the upper limit condition and the lower limit condition for the dimension of the gap required by the optical properties of the liquid crystal panel 300. That is, even when the height H0 of the columnar spacer 40 has dispersion, the liquid crystal display device including the liquid crystal panel 300 can be manufactured with a high yield rate.

Specifically, the determination function Q1 is defined by a linear function including the intersection of the high-temperature limit BH and the cell-gap lower limit LL and the intersection of the low-temperature limit BL and the cell-gap upper limit LU. When the linear function includes the intersection of the high-temperature limit BH and the cell-gap lower limit LL, a lower limit of the allowable height H0 of the columnar spacer 40 can be lowered. When the linear function includes the intersection of the low-temperature limit BL and the cell-gap upper limit LU, an upper limit of the allowable height H0 of the columnar spacer 40 can be raised. From the above, according to this preferred embodiment (FIG. 12), the range of the allowable height HA can be widened in comparison to the case of the comparative example (FIG. 13). With this, even when the height H0 of the columnar spacer 40 has dispersion, the liquid crystal display device including the liquid crystal panel 300 can be manufactured with a higher yield rate.

Further, the mother substrate that is concerned for manufacturing defective products in advance and the liquid crystal panel that is concerned for generating defectiveness in reliability in advance are removed from the manufacturing process before completing the manufacture. Thus, such inefficiency is prevented that further processing is performed on the mother substrate or the liquid crystal panel. Thus, manufacturing cost is reduced. In particular, prior to the attachment in Step S51, a defective mother substrate (for example, the mother substrate including the CF substrate 200) is removed from the manufacturing process in Step S22, and thus attachment of a mother substrate to correspond to the defective mother substrate (for example, the mother substrate including the TFT substrate 100), and further, attachment of a polarizing plate and a control substrate are prevented. That is, loss of members, which is caused by being combined to the defective mother substrate, is prevented. Also in this respect, manufacturing cost is reduced.

Second Preferred Embodiment

In the first preferred embodiment, as illustrated in FIG. 5, description is given to the case where one type of columnar spacer is used. In this preferred embodiment, description is given to the case of a dual spacer structure as illustrated in FIG. 8. In the dual spacer structure, the high-temperature gap unevenness is mainly related to the columnar spacer 40, and the low-temperature bubbling is mainly related to the sub-columnar spacer 41.

Figure 14:
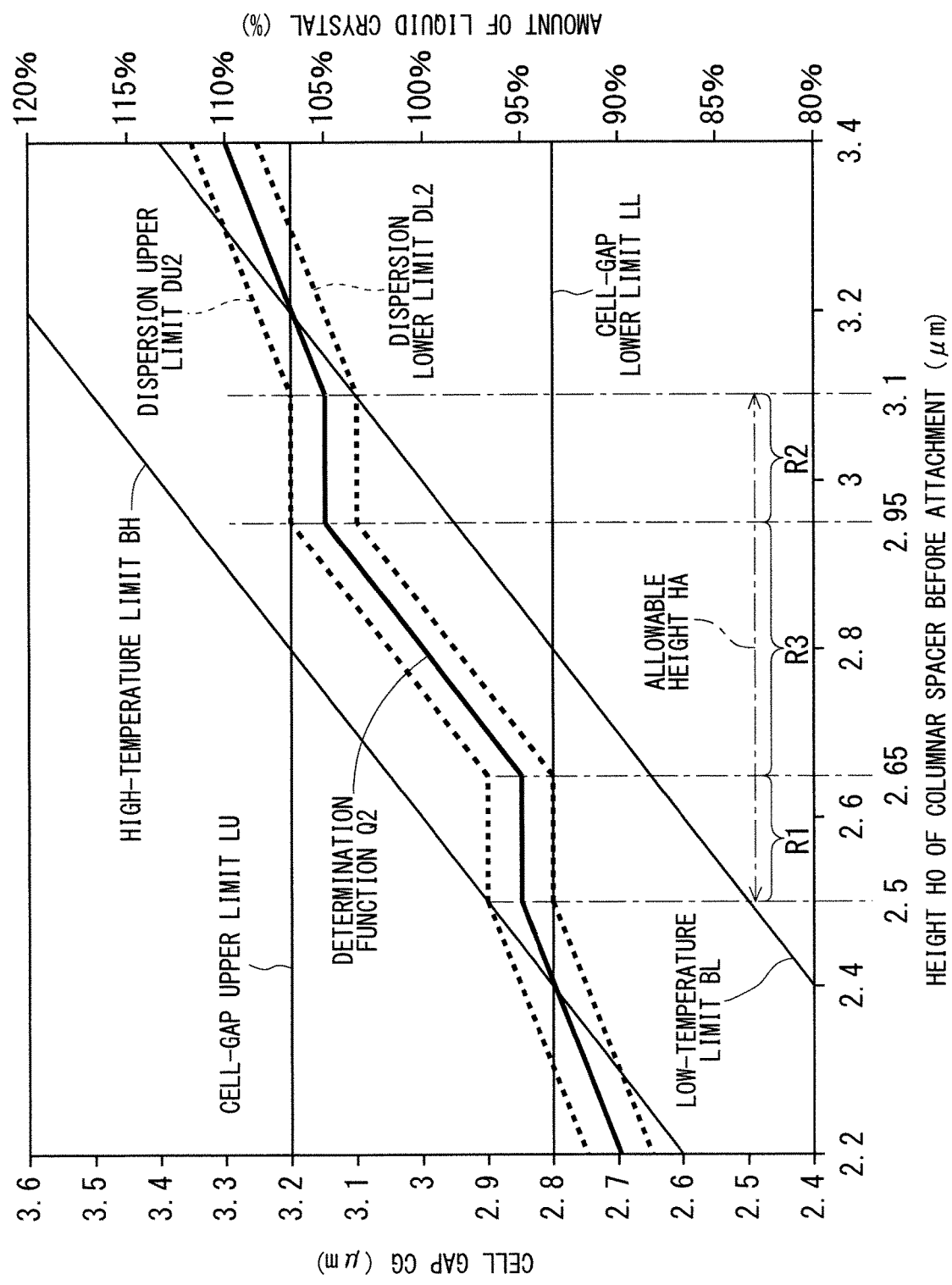
FIG. 14 is a graph for showing an example of a method of calculating the amount of the liquid crystal in the method of manufacturing a liquid crystal display device according to a second preferred embodiment of the present invention.

FIG. 14 is a graph for showing an example of a method of calculating the amount of the liquid crystal according to this preferred embodiment. In FIG. 14, for the purpose of obtaining a comprehensive graph that corresponds to the dual spacer structure, a horizontal axis is represented with use of the height H0 of the columnar spacer 40 (FIG. 8). The height H0 of the columnar spacer 40 is converted into a height of the sub-columnar spacer 41 (FIG. 8) by subtracting a dimensional difference provided at the time of designing. The dimensional difference is approximately 0.4 µm, for example. The high-temperature limit BH that corresponds to the high-temperature gap unevenness is defined focusing on the columnar spacer 40. The low-temperature limit BL that corresponds to the low-temperature bubbling is defined focusing on the sub-columnar spacer 41, and the above-mentioned conversion is applied thereto.

Note that, in a simulation for obtaining the results of FIG. 14, the area occupancy rate of the columnar spacer 40 is set to 0.019%, and the area occupancy rate of the sub-columnar spacer 41 is set to 0.65%. Further, an elastic modulus at the time of compression of 15% at room temperature (25° C.) is set to 0.5 GPa.

With reference to FIG. 14, a determination function Q2 according to this preferred embodiment is different from the determination function Q1 (FIG. 12) in that the determination function Q2 is defined by different mathematical expressions based on in which height range, out of a plurality of height ranges, the height H0 of the columnar spacer is included. Specifically, the height H0 of the columnar spacer is divided into height ranges R1 to R3 (first to third height ranges). The height range R1 is a range including a minimum allowable height of the columnar spacer. The height range R2 is a range including a maximum allowable height of the columnar spacer. The height range R3 is a range between the height range R1 and the height range R2.

In the height range R3, as the determination function Q2, a linear function showing an intermediate value of the high-temperature limit BH and the low-temperature limit BL is used. In the height range R1 and the height range R2, as the determination function Q2, values that are different from the above-mentioned intermediate value are used. In other words, mathematical expressions that are different from the above-mentioned mathematical expression showing the intermediate value are used. Specifically, in the height range R1, in order to preferentially arrange a dispersion lower limit DL2 not to exceed the cell-gap lower limit LL, such a constant function that corresponds to the cell gap CG=2.85 µm is used. The constant is a value that corresponds to 2.85 µm, which is a value securing an allowance of 0.05 µm with respect to a dimensional lower limit of 2.8 µm of the cell gap CG. In the height range R2, in order to preferentially arrange a dispersion upper limit DU2 not to exceed the cell-gap upper limit LU, such a constant function that corresponds to the cell gap CG=3.15 µm is used. The constant is a value that corresponds to 3.15 µm, which is a value securing an allowance of 0.05 µm with respect to a dimensional upper limit of 3.2 µm of the cell gap CG.

Note that, configuration other than the above is substantially the same as the configuration in the above-mentioned first preferred embodiment, and thus the description thereof is herein not repeated. Also in this preferred embodiment, similarly as the first preferred embodiment, the allowable height HA is from 2.5 µm or more and 3.1 µm or less, and hence the allowable range is 0.6 µm. Thus, in this preferred embodiment in comparison to the comparative example (FIG. 13), the allowable range of the height H0 is doubled. That is, larger dispersion is allowed in the height H0.

Further, according to this preferred embodiment, the determination function Q2 is defined by different mathematical expressions based on in which height range, out of the plurality of height ranges R1 to R3, the height of the columnar spacer is included. With this, out of the requirements of the prevention of the maldistribution of the liquid crystal layer 30 caused by temperature increase, the prevention of the generation of the air bubbles inside the gap caused by temperature decrease, and the satisfaction of the upper limit condition and the lower limit condition for the dimension of the gap required by the optical properties of the liquid crystal panel, which requirement is to be focused can be optimized for the respective height ranges R1 to R3. Thus, a yield rate in manufacture of the liquid crystal display device including the liquid crystal panel can be further enhanced.

Further, according to this preferred embodiment, in a case where the height of the columnar spacer is roughly an intermediate height in the allowable height HA, that is, in a case where the height of the columnar spacer is in the height range R3, the determination function Q2 is defined by the intermediate value of the high-temperature limit BH and the low-temperature limit BL. In other words, prevention of the high-temperature gap unevenness and the low-temperature bubbling is preferentially taken into consideration. With this, in a case where the height of the columnar spacer is roughly the intermediate height in the allowable height HA, an allowance for the high-temperature gap unevenness and the low-temperature bubbling becomes larger. That is, reliability of the liquid crystal display device can be enhanced. The height of the columnar spacer is in many cases included in the roughly intermediate height range R3 stochastically, and hence more liquid crystal display devices with high reliability can be obtained according to this preferred embodiment.

Further, in a case where the height of the columnar spacer is in the vicinity of an upper limit or a lower limit in the allowable height HA, that is, in a case where the height of the columnar spacer is in the height range R1 or the height range R2, the determination function Q2 is defined by the values different from the above-mentioned intermediate value. With this, even in a case where the height of the columnar spacer is in the vicinity of the upper limit or the lower limit in the allowable height HA, the amount of the liquid crystal can be optimized so as to be capable of obtaining nondefective products.

Figure 15:
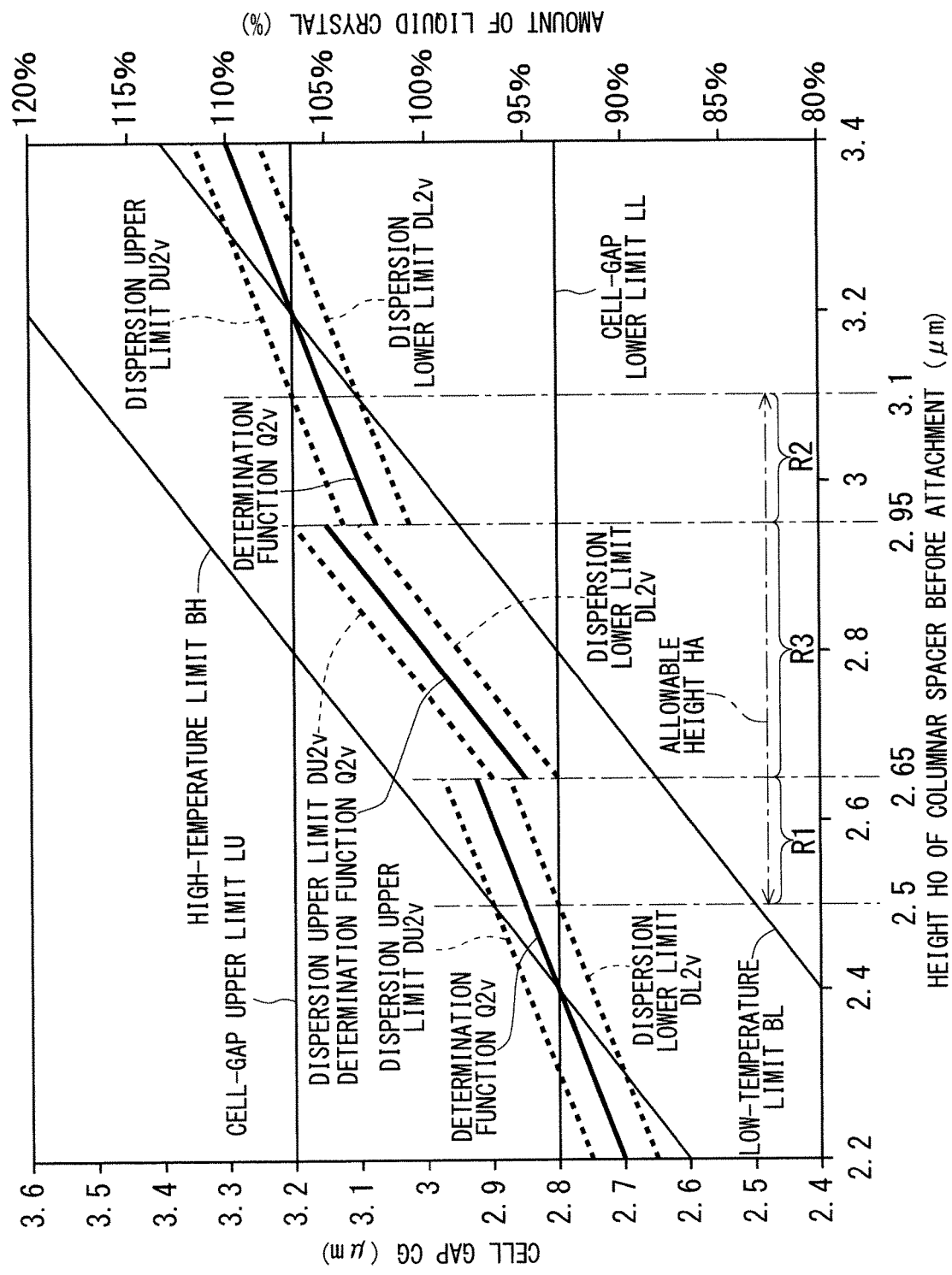
FIG. 15 is a graph for showing a modified example of FIG. 14.

FIG. 15 shows a determination function Q2ν, which is a modified example of the determination function Q2 (FIG. 14), with a dispersion upper limit DU2ν and a dispersion lower limit DL2ν thereof. The determination function Q2ν is different from the determination function Q2 in the height ranges R1 and R2, and is defined not by a constant function but by a linear function similar to the determination function Q1 (FIG. 12). The linear function includes the intersection of the high-temperature limit BH and the cell-gap lower limit LL and the intersection of the low-temperature limit BL and the cell-gap upper limit LU. Also in this modified example, effects substantially similar to those of this preferred embodiment can be obtained. Further, in a case where the height H0 of the columnar spacer is in the height range R1 or the height range R2, a yield rate in manufacture can be further enhanced.

Third Preferred Embodiment

Figure 16:
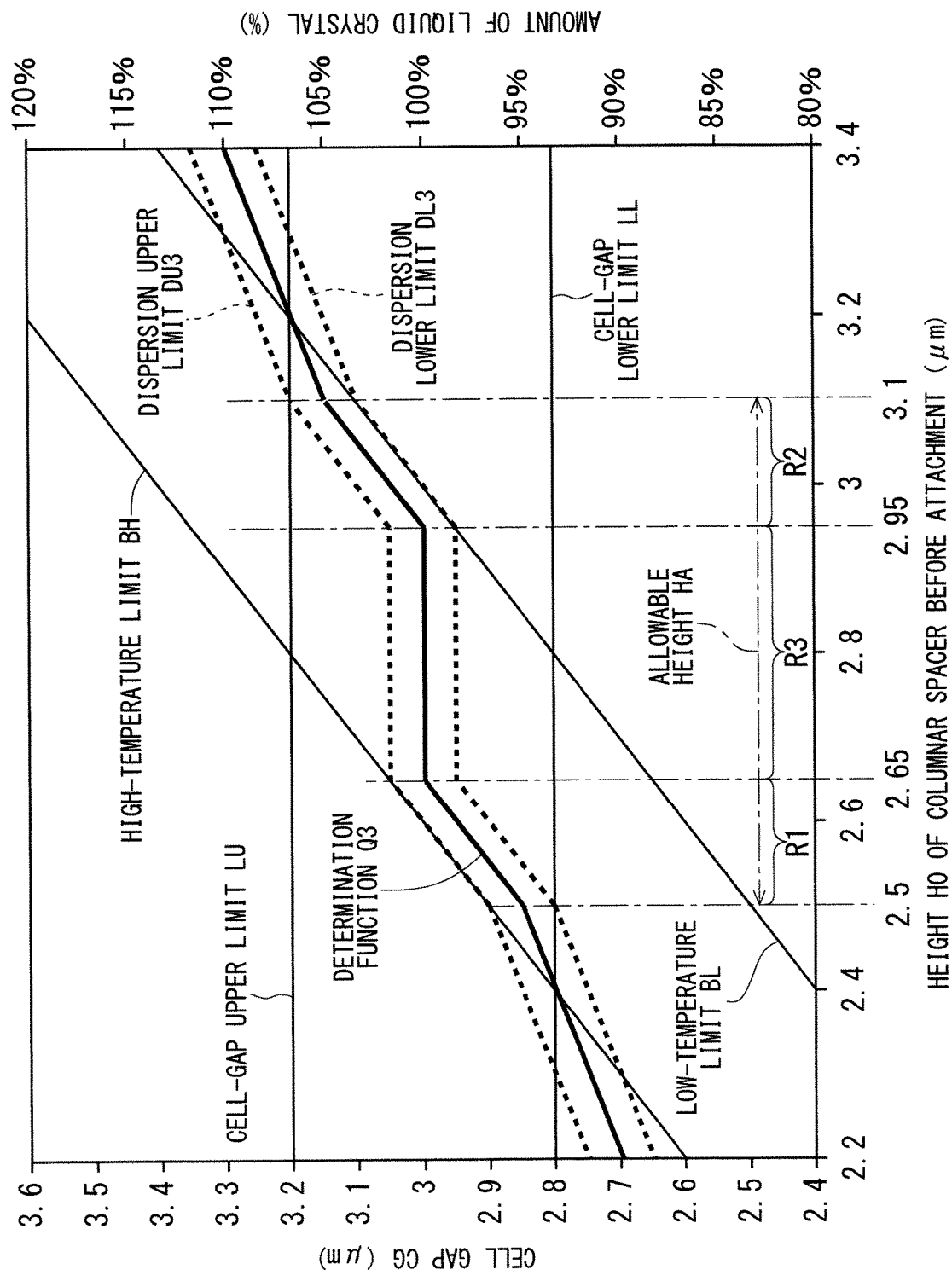
FIG. 16 is a graph for showing an example of a method of calculating the amount of the liquid crystal in the method of manufacturing a liquid crystal display device according to a third preferred embodiment of the present invention.

FIG. 16 is a graph for showing an example of a method of calculating the amount of the liquid crystal according to this preferred embodiment. In the height range R3, as a determination function Q3, an intermediate value of the cell-gap upper limit LU and the cell-gap lower limit LL is used. In the height range R1 and the height range R2, as the determination function Q3, values that are different from the above-mentioned intermediate value are used. Specifically, in the height range R1, in order to preferentially arrange a dispersion upper limit DU3 not to exceed the high-temperature limit BH, such a linear function is used that an allowance corresponding to the dispersion of 0.05 μm is secured with respect to the high-temperature limit BH. In the height range R2, in order to preferentially arrange a dispersion lower limit DL3 not to exceed the low-temperature limit BL, such a linear function is used that an allowance corresponding to the dispersion of 0.05 μm is secured with respect to the low-temperature limit BL.

Note that, configuration other than the above is substantially the same as the configuration in the above-mentioned second preferred embodiment, and thus the description thereof is herein not repeated. Also in this preferred embodiment, similarly as the second preferred embodiment, the allowable height HA is from 2.5 μm or more and 3.1 μm or less, and hence the allowable range is 0.6 μm. Thus, in this preferred embodiment in comparison to the comparative example (FIG. 13), the allowable range of the height H0 is doubled. That is, larger dispersion is allowed in the height H0.

Further, according to this preferred embodiment, in a case where the height H0 of the columnar spacer is roughly an intermediate height in the allowable height HA, that is, in a case where the height H0 of the columnar spacer is in the height range R3, the determination function Q3 is defined by the intermediate value of the cell-gap upper limit LU and the cell-gap lower limit LL. With this, in a case where the height of the columnar spacer is roughly the intermediate height in the allowable height HA, the value of the cell gap is set as the design center value (3.0 μm in the example of FIG. 16). Thus, the optical properties with good fidelity to the designing can be obtained. The height H0 of the columnar spacer is in many cases included in the roughly intermediate height range R3 stochastically, and hence the liquid crystal display device having the optical properties with good fidelity to the designing can be more likely to be obtained according to this preferred embodiment.

Further, in a case where the height H0 of the columnar spacer is in the vicinity of the upper limit or the lower limit in the allowable height HA, that is, in a case where the height H0 of the columnar spacer is in the height range R1 or the height range R2, the determination function Q3 is defined by the values different from the above-mentioned intermediate value. With this, even in a case where the height of the columnar spacer is in the vicinity of the upper limit or the lower limit in the allowable height HA, the amount of the liquid crystal can be optimized so as to be capable of obtaining nondefective products.

Figure 17:
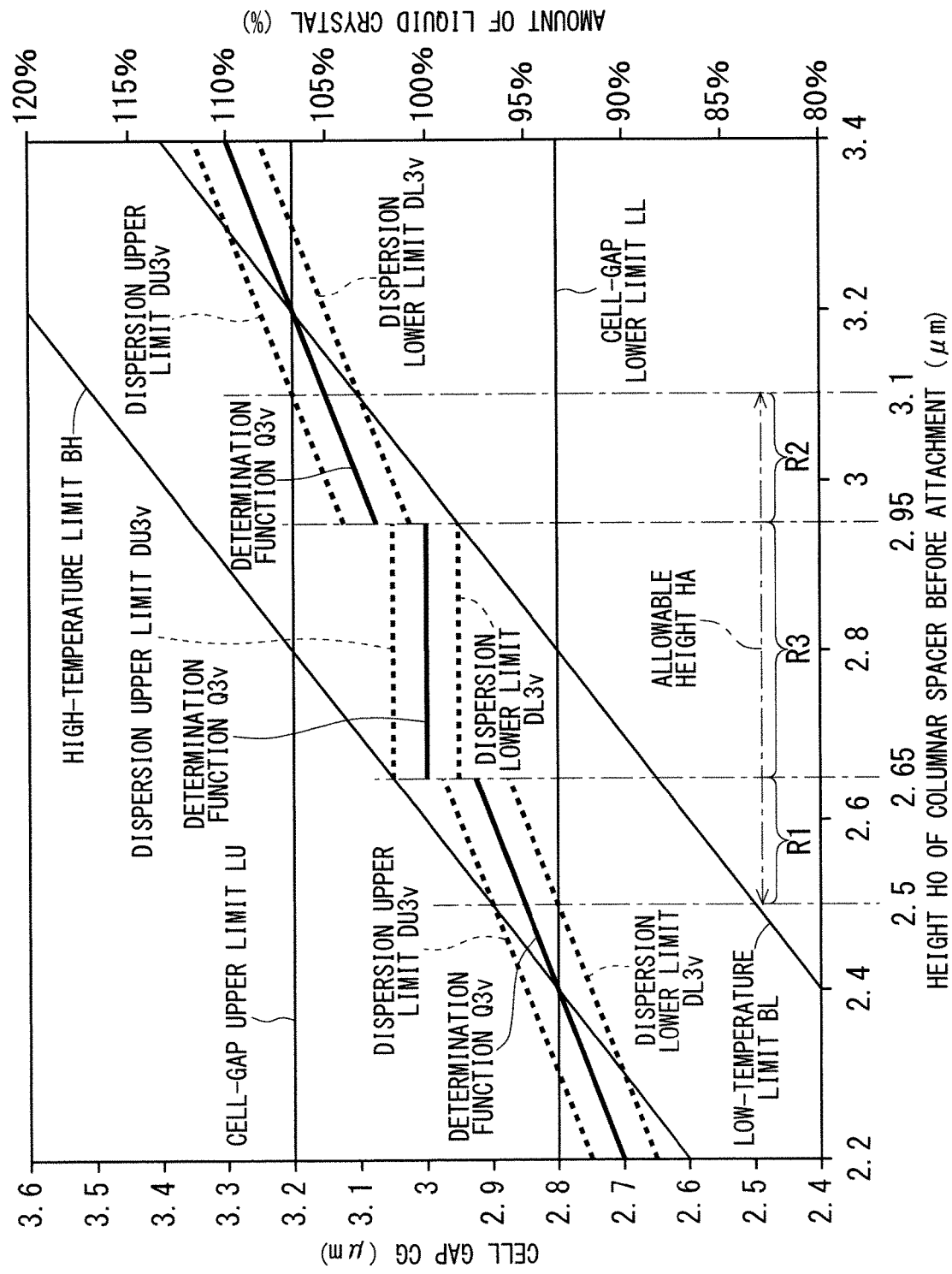
FIG. 17 is a graph for showing a modified example of FIG. 16.

FIG. 17 shows a determination function Q3ν, which is a modified example of the determination function Q3 (FIG. 16), with a dispersion upper limit DU3ν and a dispersion lower limit DL3ν thereof. The determination function Q3ν is different from the determination function Q3 in the height range R1 and the height range R2, and is defined by a linear function similar to the determination function Q1 (FIG. 12). The linear function includes the intersection of the high-temperature limit BH and the cell-gap lower limit LL and the intersection of the low-temperature limit BL and the cell-gap upper limit LU. Also in this modified example, effects substantially similar to those of this preferred embodiment can be obtained. Further, in a case where the height H0 of the columnar spacer is in the height range R1 or the height range R2, a yield rate in manufacture can be further enhanced.

Fourth Preferred Embodiment

In the second and third preferred embodiments, description is given to an example of a case where the elastic modulus of the columnar spacer at the time of compression of 15% at room temperature (25° C.) is 0.5 GPa. In this preferred embodiment, description is given to an example of a case where the elastic modulus is 0.9 GPa. In other words, such an example of a case is given that, as a material for the columnar spacer, a material having a comparatively narrow elastic deformation range or a material comparatively less liable to be elastically deformed is used.

Figure 18:
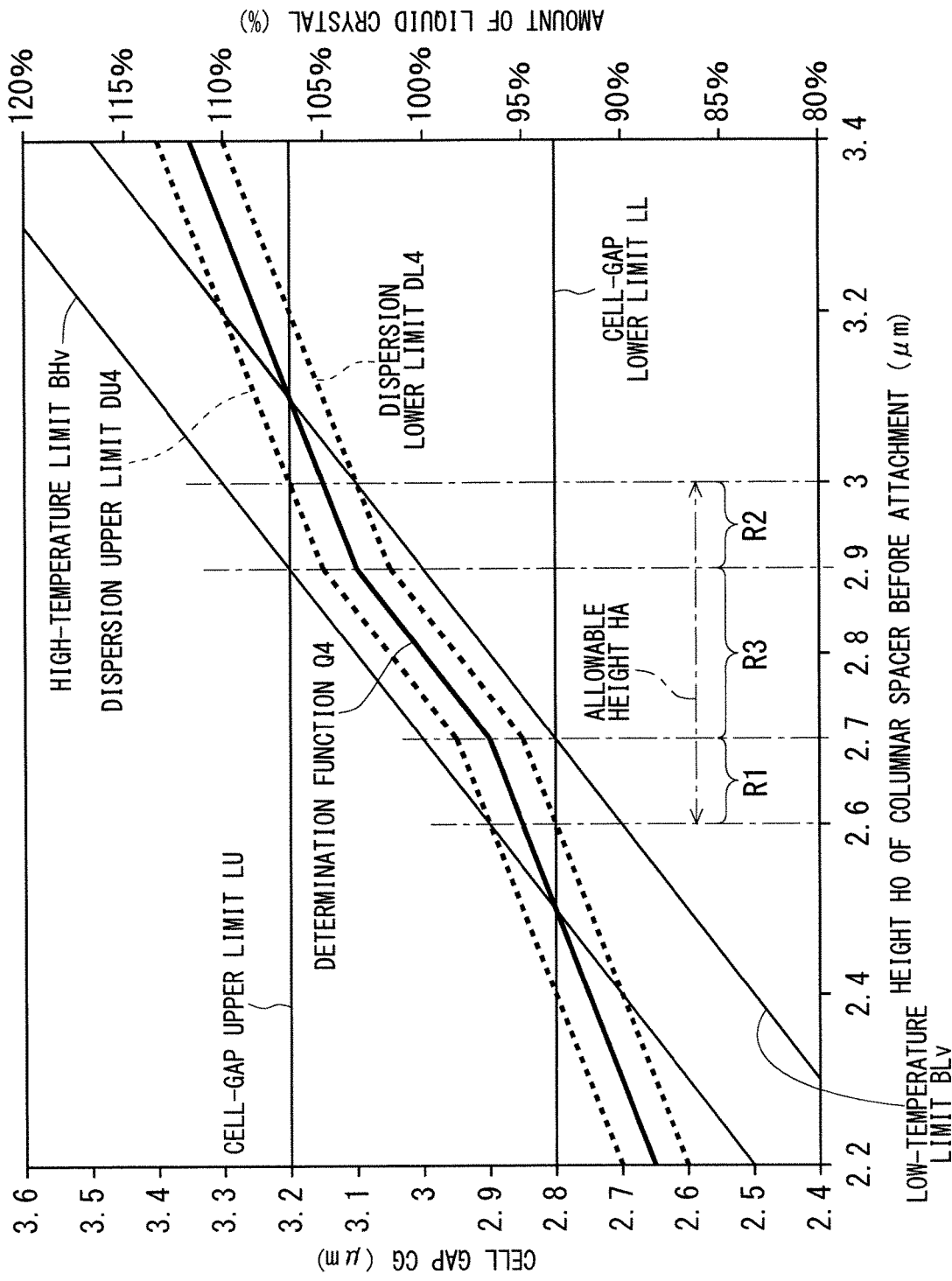
FIG. 18 is a graph for showing an example of a method of calculating the amount of the liquid crystal in the method of manufacturing a liquid crystal display device according to a fourth preferred embodiment of the present invention.

FIG. 18 is a graph for showing an example of a method of calculating the amount of the liquid crystal according to this preferred embodiment.

In the height range R3 (from 2.7 μm to 2.9 μm in this preferred embodiment), as a determination function Q4, similarly to the second preferred embodiment (FIG. 14), a linear function showing an intermediate value of a high-temperature limit BHv and a low-temperature limit BLv is used. Note that, due to the difference in materials for the columnar spacer, an interval between the high-temperature limit BHv and the low-temperature limit BLv is narrow compared to an interval between the high-temperature limit BH and the low-temperature limit BL (refer to FIG. 14).

In the height range R1 (from 2.6 μm to 2.7 μm in this preferred embodiment), such a linear function is used that includes an intersection of the high-temperature limit BHv and the cell-gap lower limit LL and a point defined by the determination function Q4 with respect to a minimum height in the height range R3. In the height range R2 (from 2.9 μm to 3 μm in this preferred embodiment), such a linear function is used that includes an intersection of the low-temperature limit BLv and the cell-gap upper limit LU and a point defined by the determination function Q4 with respect to a maximum height in the height range R3.

Note that, in a case where a dispersion upper limit DU4 and a dispersion lower limit DL4 with respect to the determination function Q4 are not taken into consideration, that is, in a case where the dispersion may be regarded to be zero, a lower limit of the height range R1 is extended down to 2.5 μm, which corresponds to the intersection of the high-temperature limit BHv and the cell-gap lower limit LL. Similarly, an upper limit of the height range R2 is extended up to 3.1 μm, which corresponds to the intersection of the low-temperature limit BLv and the cell-gap upper limit LU.

Note that, configuration other than the above is substantially the same as the configuration in the above-mentioned second preferred embodiment, and thus the same or corresponding components are denoted by the same reference symbols and the description thereof is herein not repeated.

Figure 19:
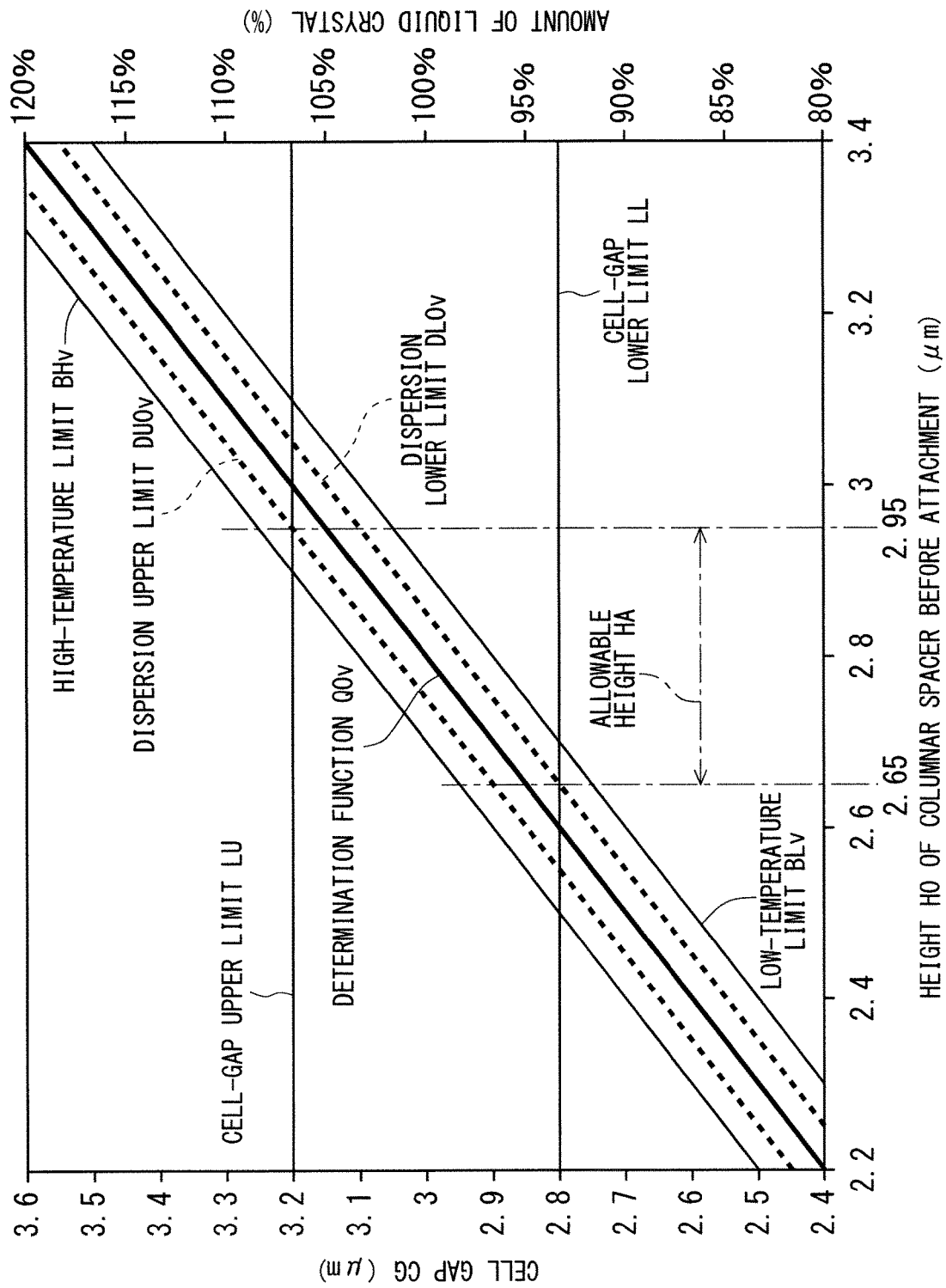
FIG. 19 is a graph for showing a method of calculating the amount of the liquid crystal according to a comparative example.

FIG. 19 is a graph for showing a method of calculating the amount of the liquid crystal according to a comparative example in comparison to FIG. 18. In this comparative example, a determination function Q0v for the amount of the liquid crystal is different from the determination function Q4 (FIG. 18) in that the determination function Q0v is provided in consideration of the high-temperature limit BHv and the low-temperature limit BLv alone. For this reason, when the dispersion in the correlation of the amount of the liquid crystal and the cell gap, that is, a dispersion upper limit DU0v and a dispersion lower limit DL0v, is taken into consideration, the allowable height HA is from 2.65 μm or more and 2.95 μm or less, and hence the allowable range is 0.3 μm. On the contrary, in the preferred embodiment (FIG. 18), the allowable height HA is from 2.6 μm or more and 3 μm or less, and hence the allowable range is 0.4 μm. Thus, according to this preferred embodiment, larger dispersion is allowed in the height H0 of the columnar spacer.

In a case where the height H0 of the columnar spacer is not in the height range R3 but in the height range R1 or R2, it is more difficult to secure both of reliability in which the high-temperature gap unevenness and the low-temperature bubbling can be prevented and the high optical properties. According to the determination function Q4 of this preferred embodiment, in the height range R1, an allowance for each of the high-temperature limit BHv and the cell-gap lower limit LL is secured in a well-balanced manner. Further, in the height range R2, an allowance for the low-temperature limit BLv and the cell-gap upper limit LU is secured in a well-balanced manner. With this, it is easier to secure both of the reliability and the high optical properties.

As mentioned above, in this preferred embodiment, the material for the columnar spacer has a comparatively large elastic modulus. As a result, the interval between the high-temperature limit BHv and the low-temperature limit BLv according to this preferred embodiment is narrow compared to the interval between the high-temperature limit BH and the low-temperature limit BL (refer to FIG. 14). As the interval between the high-temperature limit and the low-temperature limit is wide, the allowance for the high-temperature limit and the low-temperature limit can be enhanced more easily. Thus, in this point of view, it is preferable that the elastic modulus of the columnar spacer be small. The elastic modulus of the columnar spacer at the time of compression of 15% at room temperature (25° C.) is preferably from approximately 0.2 GPa or more and 1.0 GPa or less, more preferably from approximately 0.2 GPa or more and 0.6 GPa or less, and is, for example, approximately 0.5 GPa as used in the first to third preferred embodiments. Further, the area occupancy rate of the columnar spacer 40 (FIG. 5 or FIG. 8) also has influence on the interval between the high-temperature limit and the low-temperature limit, and it is preferable that the area occupancy rate be small in the above-mentioned point of view. The area occupancy rate is preferably approximately 0.02% or less, and is, for example, approximately 0.019% as used in the first to third preferred embodiments.

Figure 20:
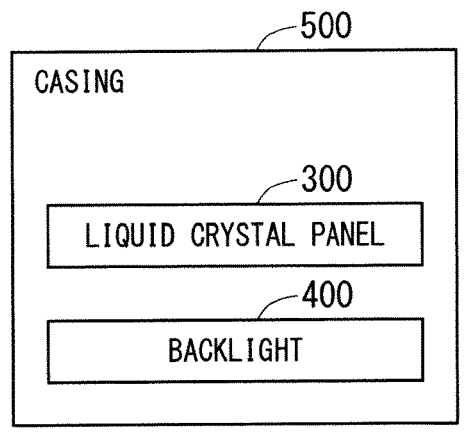
FIG. 20 is a block diagram for illustrating an example of configuration of the liquid crystal display device.

Note that, the determination functions described in the above-mentioned first to fourth preferred embodiments are applicable to any of the cases where one type of columnar spacer is used (FIG. 5) and where a plurality of types of columnar spacers are used (FIG. 8). Further, in the above, description is given to the liquid crystal panel of an active matrix type, which is driven by TFTs. However, the liquid crystal panel is not limited thereto. Further, it suffices that the liquid crystal display device be a device including the liquid crystal panel, and the liquid crystal display device may be the liquid crystal panel itself. Typically, the liquid crystal display device of a transmission type or a semi-transmission type includes, as illustrated in FIG. 20, the liquid crystal panel 300, a backlight 400, and a casing 500 for accommodating the liquid crystal panel 300 and the backlight 400.

Fifth Preferred Embodiment

As mentioned above, the method of manufacturing a liquid crystal display device includes a step of calculating the amount of the liquid crystal and a step of dropping the liquid crystal with the calculated amount of the liquid crystal. In this preferred embodiment, description is given to a manufacturing system for a liquid crystal display device that is capable of calculating the amount of the liquid crystal.

Figure 21:
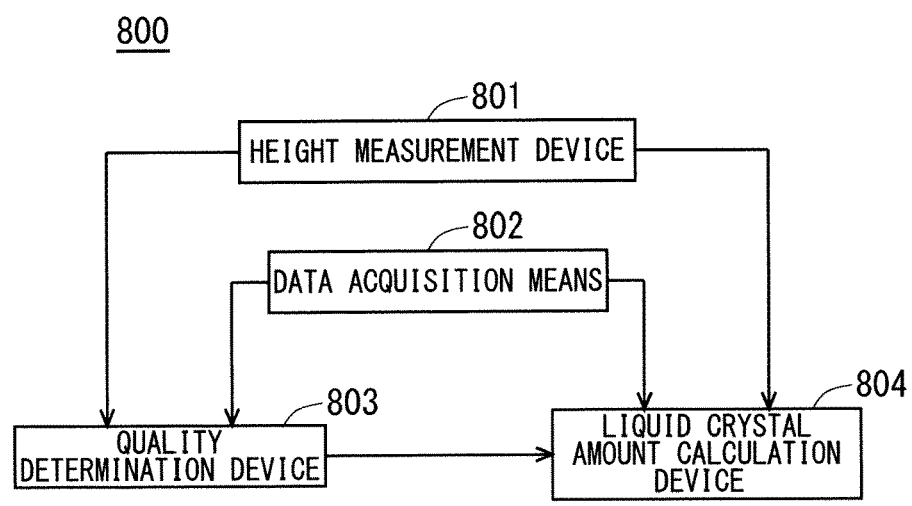
FIG. 21 is a block diagram for schematically illustrating configuration of a manufacturing system for a liquid crystal display device according to a fifth preferred embodiment of the present invention.

With reference to FIG. 21, a manufacturing system 800 includes a height measurement device 801, data acquisition means 802 (a data acquirer), a quality determination device 803, and a liquid crystal amount calculation device 804, which are connected to each other through a communication path as needed. The data acquisition means 802, the quality determination device 803, and the liquid crystal amount calculation device 804 may be formed of a computer system such as a personal computer, for example. In such a case, it is preferable that the computer system and the height measurement device 801 be connected to each other through a communication path.

The height measurement device 801 measures the height H0 of the columnar spacer 40 in Step S21 (FIG. 11). The height measurement device 801 can transmit measured data to the quality determination device 803 and the liquid crystal amount calculation device 804.

The quality determination device 803 determines, based on the height H0 of the columnar spacer 40 and on the cell-gap upper limit LU and the cell-gap lower limit LL that correspond to the upper limit condition and the lower limit condition for the dimension of the cell gap, whether the mother substrate including the CF substrate 200 (or the TFT substrate 100) on which the columnar spacer 40 is provided is defective or nondefective. The liquid crystal amount calculation device 804 determines, based on the height H0 of the columnar spacer 40 and on the upper limit condition and the lower limit condition for the dimension of the cell gap (cell-gap upper limit LU and cell-gap lower limit LL), the amount of the liquid crystal for providing the liquid crystal layer 30, in a case where determination is made as "nondefective" by the quality determination device 803. As the determination methods, any one of the methods described in the first to fourth preferred embodiments may be used. Specifically, the amount of the liquid crystal may be determined by the determination function Q1, Q2, Q2v, Q3, Q3v, or Q4 dependent upon the height H0 of the columnar spacer 40 (FIG. 12 and FIG. 14 to FIG. 18).

The data acquisition means 802 acquires data of the upper limit condition and the lower limit condition for the dimension of the gap required by the optical properties of the liquid crystal panel. Each of the upper limit condition and the lower limit condition for the dimension of the gap is converted into the cell-gap upper limit LU and the cell-gap lower limit LL (FIG. 12 and FIG. 14 to FIG. 18). As mentioned above, the conversion is defined by the area in which the liquid crystal layer 30 is to be formed. Note that, the cell-gap upper limit LU and the cell-gap lower limit LL may be directly acquired.

In order to provide the above-mentioned determination functions in accordance with the specifications of each liquid crystal display device, data of the high-temperature limit BH and the low-temperature limit BL (or, the high-temperature limit BHv and the low-temperature limit BLv) is also needed. Those data may be directly acquired by the data acquisition means 802. Alternatively, instead of such data, data containing the dimension α, the dimension β, and the calculation formula for converting the cell gap CG into a volume of the amount of the liquid crystal, which are described in the first preferred embodiment, may be acquired. With such data, the high-temperature limit BH and the low-temperature limit BL can be calculated. The calculation may be performed through execution of a program by the above-mentioned computer system. Note that, the calculation formula is defined by the area in which the liquid crystal layer 30 is to be formed.

The acquisition of the data performed by the data acquisition means 802 may be performed in such a manner that the data acquisition means 802 accepts data that is manually input by an operator. In such a case, the data acquisition means 802 may be formed of an input device such as a keyboard, a touch panel, and a mouse. Alternatively, the acquisition of the data performed by the data acquisition means 802 may be performed in such a manner that the data acquisition means 802 accepts electronic data. The electronic data may be data stored in a storage medium, for example. In such a case, the data acquisition means 802 may be formed of a reading device for a storage medium such as a digital versatile disc (DVD). The data acquisition means 802 may be capable of storing acquired data, or of managing data so that the data is available for the quality determination device 803 and the liquid crystal amount calculation device 804. A data management device for storing or managing data as described above may be provided in the data acquisition means 802. Further, the data management device may store or manage measured data obtained by the height measurement device 801. In a case where the data is stored, a memory is provided in the data acquisition means 802. As the memory, any storage medium is applicable, for example, a non-volatile or volatile semiconductor memory such as a RAM, a ROM, a flash memory, an erasable programmable read only memory (EPROM), and an electrically erasable programmable read only memory (EEPROM), a hard disk drive (HDD), a magnetic disk, a flexible disk, an optical disc, a compact disc, a MiniDisc, a DVD, and a drive device therefor.

Further, the manufacturing system 800 may include a sorting device for removing the mother substrate determined as "defective" in the quality determination in Step S22 (FIG. 11) from the manufacturing process. Further, the manufacturing system 800 may include a sorting device for removing the mother cell substrate determined as "defective" in the quality determination in Step S62 (FIG. 11) from the manufacturing process. Further, the manufacturing system 800 may include a sorting device for removing the liquid crystal panel determined as "defective" in the quality determination in Step S63 (FIG. 11) from the manufacturing process. When each of the sorting devices is connected to the quality determination device 803 through a communication path, the sorting devices can be operated automatically. Note that, it is preferable that a processing device that treats substrates be coupled by a conveyance device such as a conveyor.

According to this preferred embodiment, in a case where the quality of the mother substrate including the CF substrate 200 (or the TFT substrate 100) on which the columnar spacer is provided is determined as "nondefective," the amount of the liquid crystal is determined. With this, the mother substrate including the CF substrate 200 (or the TFT substrate 100), of which quality is determined as "defective," can be removed from the manufacturing process. Thus, even when the height H0 of the columnar spacer has dispersion, the liquid crystal display device can be manufactured with a high yield rate.

Further, with the manufacturing system 800, a part or all of the manufacturing process for a liquid crystal manufacturing device is automated. With this, the manufacturing flow (FIG. 11) can be processed promptly.

Figure 22:
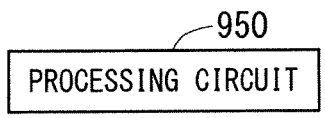
FIG. 22 is a view for illustrating an example of hardware configuration of a quality determination device and a liquid crystal amount calculation device.

FIG. 22 is a view for illustrating an example of hardware configuration of the computer system that forms the quality determination device 803 and the liquid crystal amount calculation device 804. In this example, the quality determination device 803 and the liquid crystal amount calculation device 804 are realized by a processing circuit 950. Dedicated hardware may be applied to the processing circuit 950, or a processor for executing a program stored in a memory (central processing unit (CPU), central processing unit, processing unit, computing unit, microprocessor, microcomputer, and digital signal processor (DSP)) may be applied to the processing circuit 950. In a case where the processing circuit 950 is dedicated hardware, as the processing circuit 950, a single circuit, a composite circuit, a programmed processor, a programmed processor for parallel programming, an application specific integrated circuit (ASIC), a field-programmable gate array (FPGA), or a combination thereof is applicable, for example. Functions of respective components of the quality determination device 803 and the liquid crystal amount calculation device 804 may be realized by a plurality of processing circuits, or such functions may be realized all together by one processing circuit.

Figure 23:
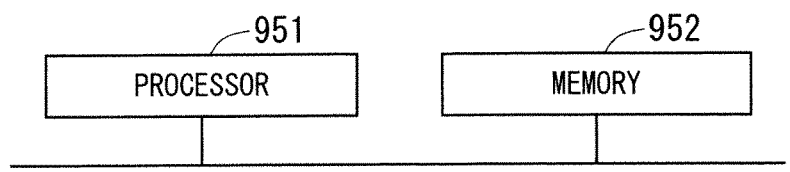
FIG. 23 is a view for illustrating an example of hardware configuration of the quality determination device and the liquid crystal amount calculation device.

FIG. 23 is an illustration of hardware configuration of the computer system in a case where the processing circuit 950 (FIG. 22) is formed with use of a processor. In this case, each function of the quality determination device 803 and the liquid crystal amount calculation device 804 is realized by a combination of software and the like (software, firmware, or software and firmware). The software and the like are described as a program, and are stored in a memory 952. A processor 951 as the processing circuit 950 reads and executes the program stored in the memory 952, to thereby realize functions of each component. In other words, it may be said that the program causes a computer to execute procedures and methods for each operation of the quality determination device 803 and the liquid crystal amount calculation device 804. Note that, as the memory, the memories similar to those described above may be used.

In the above, description is given to the configuration in which each function of the quality determination device 803 and the liquid crystal amount calculation device 804 is realized by any one of hardware and software. However, the present invention is not limited thereto, and such configuration may be adopted that a part of the elements of the quality determination device 803 and the liquid crystal amount calculation device 804 is realized by dedicated hardware, and another part of the elements is realized by software and the like. For example, it is possible that the processing circuit 950 as the dedicated hardware realizes functions of a part of the elements, and that the processing circuit 950 as the processor 951 realizes functions of another part of the elements by reading and executing the program stored in the a memory 952. In this manner, the quality determination device 803 and the liquid crystal amount calculation device 804 can realize the above-mentioned each function with hardware, software, and the like, or a combination thereof.

Note that, in the present invention, each of the preferred embodiments may be freely combined, and each of the preferred embodiments may be appropriately modified or omitted within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A method of manufacturing a liquid crystal display device including a liquid crystal panel having a first substrate and a second substrate that oppose each other through intermediation of a gap, at least one columnar spacer for retaining said gap, and a liquid crystal layer inside said gap, the method comprising the steps of:

forming said at least one columnar spacer on said first substrate;

measuring a height of said at least one columnar spacer; and dropping liquid crystal on any one of said first substrate and said second substrate with an amount of the liquid crystal that is determined based on a determination function dependent upon the height of said at least one columnar spacer in order to provide said liquid crystal layer, said determination function being provided in advance in consideration of prevention of maldistribution of said liquid crystal layer caused by temperature increase, prevention of generation of air bubbles inside said gap caused by temperature decrease, and satisfaction of an upper limit condition and a lower limit condition for a dimension of said gap required by optical properties of said liquid crystal panel, wherein said determination function calculates said amount of the liquid crystal within a range defined by a first upper limit function for defining the amount of the liquid crystal estimated to prevent the maldistribution of said liquid crystal layer caused by temperature increase, a first lower limit function for defining the amount of the liquid crystal estimated to prevent the generation of the air bubbles inside said gap caused by temperature decrease, and a second upper limit function and a second lower limit function each for defining the amount of the liquid crystal estimated to satisfy the upper limit condition and the lower limit condition for the dimension of said gap required by the optical properties of said liquid crystal panel, and wherein one of the following:

said determination function is defined by a linear function including an intersection of said first upper limit function and said second lower limit function and an intersection of said first lower limit function and said second upper limit function, an intermediate value of said first upper limit function and said first lower limit function is used as said determination function in a third height range between a first height range including a minimum allowable height of said at least one columnar spacer and a second height range including a maximum allowable height of said at least one columnar spacer, and values that are different from said intermediate value are used as said determination function in said first height range and said second height range, and an intermediate value of said second upper limit function and said second lower limit function is used as said determination function in a third height range between a first height range including a minimum allowable height of said at least one columnar spacer and a second height range including a maximum allowable height of said at least one columnar spacer, and values that are different from said intermediate value are used as said determination function in said first height range and said second height range.

2. The method of manufacturing a liquid crystal display device according to claim 1, wherein said determination function is defined by said linear function including said intersection of said first upper limit function and said second lower limit function and said intersection of said first lower limit function and said second upper limit function.

3. The method of manufacturing a liquid crystal display device according to claim 1, wherein said intermediate value of said first upper limit function and said first lower limit function is used as said determination function in said third height range between said first height range including said minimum allowable height of said at least one columnar spacer and said second height range including said maximum allowable height of said at least one columnar spacer, and said values that are different from said intermediate value are used as said determination function in said first height range and said second height range.

4. The method of manufacturing a liquid crystal display device according to claim 3, wherein, in said first height range and said second height range, said determination function is defined by a linear function including the intersection of said first upper limit function and said second lower limit function and the intersection of said first lower limit function and said second upper limit function.

5. The method of manufacturing a liquid crystal display device according to claim 1, wherein said intermediate value of said second upper limit function and said second lower limit function is used as said determination function in said third height range between said first height range including said minimum allowable height of said at least one columnar spacer and said second height range including said maximum allowable height of said at least one columnar spacer, and said values that are different from said intermediate value are used as said determination function in said first height range and said second height range.

6. The method of manufacturing a liquid crystal display device according to claim 5, wherein, in said first height range and said second height range, said determination function is defined by a linear function including the intersection of said first upper limit function and said second lower limit function and the intersection of said first lower limit function and said second upper limit function.

7. A method of manufacturing a liquid crystal display device including a liquid crystal panel having a first substrate and a second substrate that oppose each other through intermediation of a gap, at least one columnar spacer for retaining said gap, and a liquid crystal layer inside said gap, the method comprising the steps of:

calculating an amount of liquid crystal for providing said liquid crystal layer with use of a manufacturing system for said liquid crystal display device, said manufacturing system including:

a height measurement device for measuring a height of said at least one columnar spacer formed on said first substrate;

a data acquirer for acquiring data of an upper limit condition and a lower limit condition for a dimension of said gap required by optical properties of said liquid crystal panel;

a quality determination device for determining whether said first substrate on which said at least one columnar spacer is provided is defective or nondefective, based on the height of said at least one columnar spacer and on said upper limit condition and said lower limit condition for the dimension of said gap; and a liquid crystal amount calculation device for determining said amount of the liquid crystal, based on a determination function dependent upon the height of said at least one columnar spacer, in a case where determination is made as nondefective by said quality determination device, said determination function calculating said amount of the liquid crystal within a range defined by a first upper limit function for defining the amount of the liquid crystal estimated to prevent maldistribution of said liquid crystal layer caused by temperature increase, a first lower limit function for defining the amount of the liquid crystal estimated to prevent the generation of the air bubbles inside said gap caused by temperature decrease, and a second upper limit function and a second lower limit function each for defining the amount of the liquid crystal estimated to satisfy the upper limit condition and the lower limit condition for the dimension of said gap required by the optical properties of said liquid crystal panel, wherein one of the following:

said determination function is defined by a linear function including an intersection of said first upper limit function and said second lower limit function and an intersection of said first lower limit function and said second upper limit function, an intermediate value of said first upper limit function and said first lower limit function is used as said determination function in a third height range between a first height range including a minimum allowable height of said at least one columnar spacer and a second height range including a maximum allowable height of said at least one columnar spacer, and values that are different from said intermediate value are used as said determination function in said first height range and said second height range, and an intermediate value of said second upper limit function and said second lower limit function is used as said determination function in a third height range between a first height range including a minimum allowable height of said at least one columnar spacer and a second height range including a maximum allowable height of said at least one columnar spacer, and values that are different from said intermediate value are used as said determination function in said first height range and said second height range; and dropping the liquid crystal with said amount of the liquid crystal.

8. The method of manufacturing a liquid crystal display device according to claim 7, wherein said determination function is defined by said linear function including said intersection of said first upper limit function and said second lower limit function and said intersection of said first lower limit function and said second upper limit function.

9. The method of manufacturing a liquid crystal display device according to claim 7, wherein said intermediate value of said first upper limit function and said first lower limit function is used as said determination function in said third height range between said first height range including said minimum allowable height of said at least one columnar spacer and said second height range including said maximum allowable height of said at least one columnar spacer, and said values that are different from said intermediate value are used as said determination function in said first height range and said second height range.

10. The method of manufacturing a liquid crystal display device according to claim 9, wherein, in said first height range and said second height range, said determination function is defined by a linear function including the intersection of said first upper limit function and said second lower limit function and the intersection of said first lower limit function and said second upper limit function.

11. The method of manufacturing a liquid crystal display device according to claim 7, wherein said intermediate value of said second upper limit function and said second lower limit function is used as said determination function in said third height range between said first height range including said minimum allowable height of said at least one columnar spacer and said second height range including said maximum allowable height of said at least one columnar spacer, and said values that are different from said intermediate value are used as said determination function in said first height range and said second height range.

12. The method of manufacturing a liquid crystal display device according to claim 11, wherein, in said first height range and said second height range, said determination function is defined by a linear function including the intersection of said first upper limit function and said second lower limit function and the intersection of said first lower limit function and said second upper limit function.

13. A manufacturing system for a liquid crystal display device including a liquid crystal panel having a first substrate and a second substrate that oppose each other through intermediation of a gap, at least one columnar spacer for retaining said gap, and a liquid crystal layer inside said gap, the manufacturing system comprising:

a height measurement device for measuring a height of said at least one columnar spacer formed on said first substrate;

a data acquirer for acquiring data of an upper limit condition and a lower limit condition for a dimension of said gap required by optical properties of said liquid crystal panel;

a quality determination device for determining whether said first substrate on which said at least one columnar spacer is provided is defective or nondefective, based on the height of said at least one columnar spacer and on said upper limit condition and said lower limit condition for the dimension of said gap; and a liquid crystal amount calculation device for determining an amount of liquid crystal for providing said liquid crystal layer, based on a determination function dependent upon the height of said at least one columnar spacer, in a case where determination is made as nondefective by said quality determination device, said determination function calculating said amount of the liquid crystal within a range defined by a first upper limit function for defining the amount of the liquid crystal estimated to prevent maldistribution of said liquid crystal layer caused by temperature increase, a first lower limit function for defining the amount of the liquid crystal estimated to prevent the generation of the air bubbles inside said gap caused by temperature decrease, and a second upper limit function and a second lower limit function each for defining the amount of the liquid crystal estimated to satisfy the upper limit condition and the lower limit condition for the dimension of said gap required by the optical properties of said liquid crystal panel, wherein one of the following:
said determination function is defined by a linear function including an intersection of said first upper limit function and said second lower limit function and an intersection of said first lower limit function and said second upper limit function, an intermediate value of said first upper limit function and said first lower limit function is used as said determination function in a third height range between a first height range including a minimum allowable height of said at least one columnar spacer and a second height range including a maximum allowable height of said at least one columnar spacer, and values that are different from said intermediate value are used as said determination function in said first height range and said second height range, and an intermediate value of said second upper limit function and said second lower limit function is used as said determination function in a third height range between a first height range including a minimum allowable height of said at least one columnar spacer and a second height range including a maximum allowable height of said at least one columnar spacer, and values that are different from said intermediate value are used as said determination function in said first height range and said second height range.

14. The manufacturing system of a liquid crystal display device according to claim 13, wherein said determination function is defined by said linear function including said intersection of said first upper limit function and said second lower limit function and said intersection of said first lower limit function and said second upper limit function.

15. The manufacturing system of a liquid crystal display device according to claim 14, wherein said intermediate value of said first upper limit function and said first lower limit function is used as said determination function in said third height range between said first height range including said minimum allowable height of said at least one columnar spacer and said second height range including said maximum allowable height of said at least one columnar spacer, and said values that are different from said intermediate value are used as said determination function in said first height range and said second height range.

16. The manufacturing system of a liquid crystal display device according to claim 15, wherein, in said first height range and said second height range, said determination function is defined by a linear function including the intersection of said first upper limit function and said second lower limit function and the intersection of said first lower limit function and said second upper limit function.

17. The manufacturing system of a liquid crystal display device according to claim 13, wherein said intermediate value of said second upper limit function and said second lower limit function is used as said determination function in said third height range between said first height range including said minimum allowable height of said at least one columnar spacer and said second height range including said maximum allowable height of said at least one columnar spacer, and said values that are different from said intermediate value are used as said determination function in said first height range and said second height range.

18. The manufacturing system of a liquid crystal display device according to claim 17, wherein, in said first height range and said second height range, said determination function is defined by a linear function including the intersection of said first upper limit function and said second lower limit function and the intersection of said first lower limit function and said second upper limit function.

* * * * *